Aug. 17, 1965    R. M. JOHNSON ETAL    3,200,471
APPARATUS FOR MANUFACTURING ELECTRICAL COMPONENTS
Filed Oct. 3, 1963    15 Sheets-Sheet 1

INVENTORS
Robert M. Johnson, John C. Manley
BY Clarence R. Patty Jr.
ATTORNEY

INVENTORS
Robert M. Johnson, John C. Manley
BY Clarence R. Patty, Jr.
ATTORNEY

Aug. 17, 1965   R. M. JOHNSON ETAL   3,200,471
APPARATUS FOR MANUFACTURING ELECTRICAL COMPONENTS
Filed Oct. 3, 1963
15 Sheets-Sheet 3

INVENTORS
Robert M. Johnson, John C. Manley
BY
Clarence R. Patty, Jr.
ATTORNEY

INVENTORS
Robert M. Johnson, John C. Manley
BY Clarence R. Patty, Jr.
ATTORNEY

Aug. 17, 1965    R. M. JOHNSON ETAL    3,200,471
APPARATUS FOR MANUFACTURING ELECTRICAL COMPONENTS
Filed Oct. 3, 1963    15 Sheets-Sheet 5

INVENTORS
Robert M. Johnson, John C. Manley
BY Clarence R Patty Jr.
ATTORNEY

Aug. 17, 1965 R. M. JOHNSON ETAL 3,200,471
APPARATUS FOR MANUFACTURING ELECTRICAL COMPONENTS
Filed Oct. 3, 1963 15 Sheets-Sheet 6
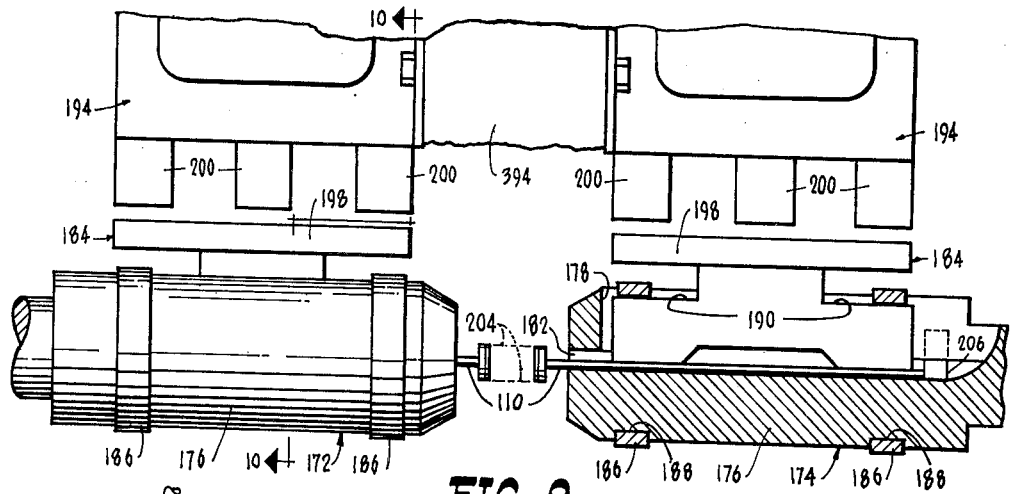
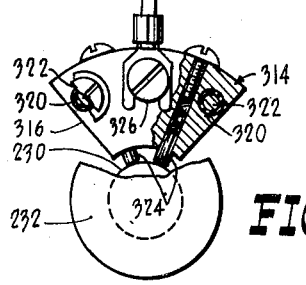
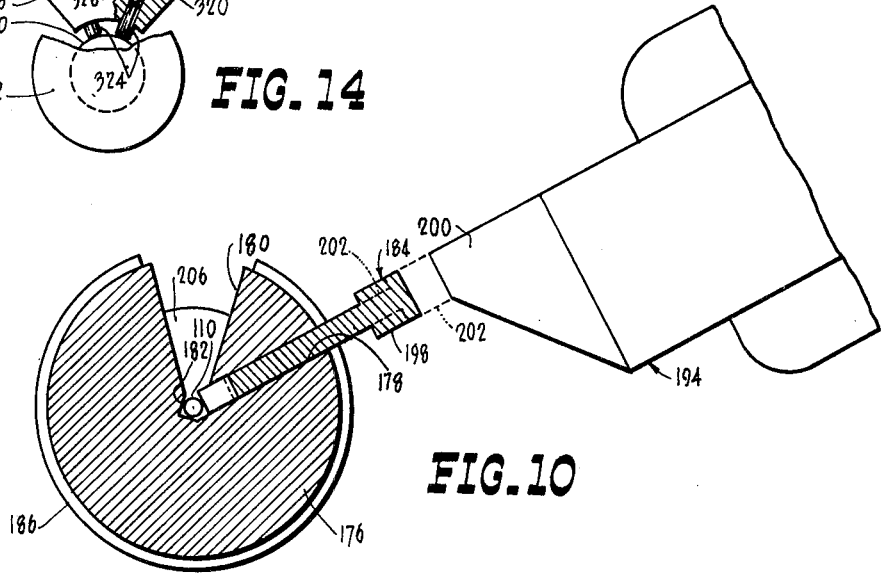
INVENTORS
Robert M. Johnson, John C. Manley
BY
ATTORNEY

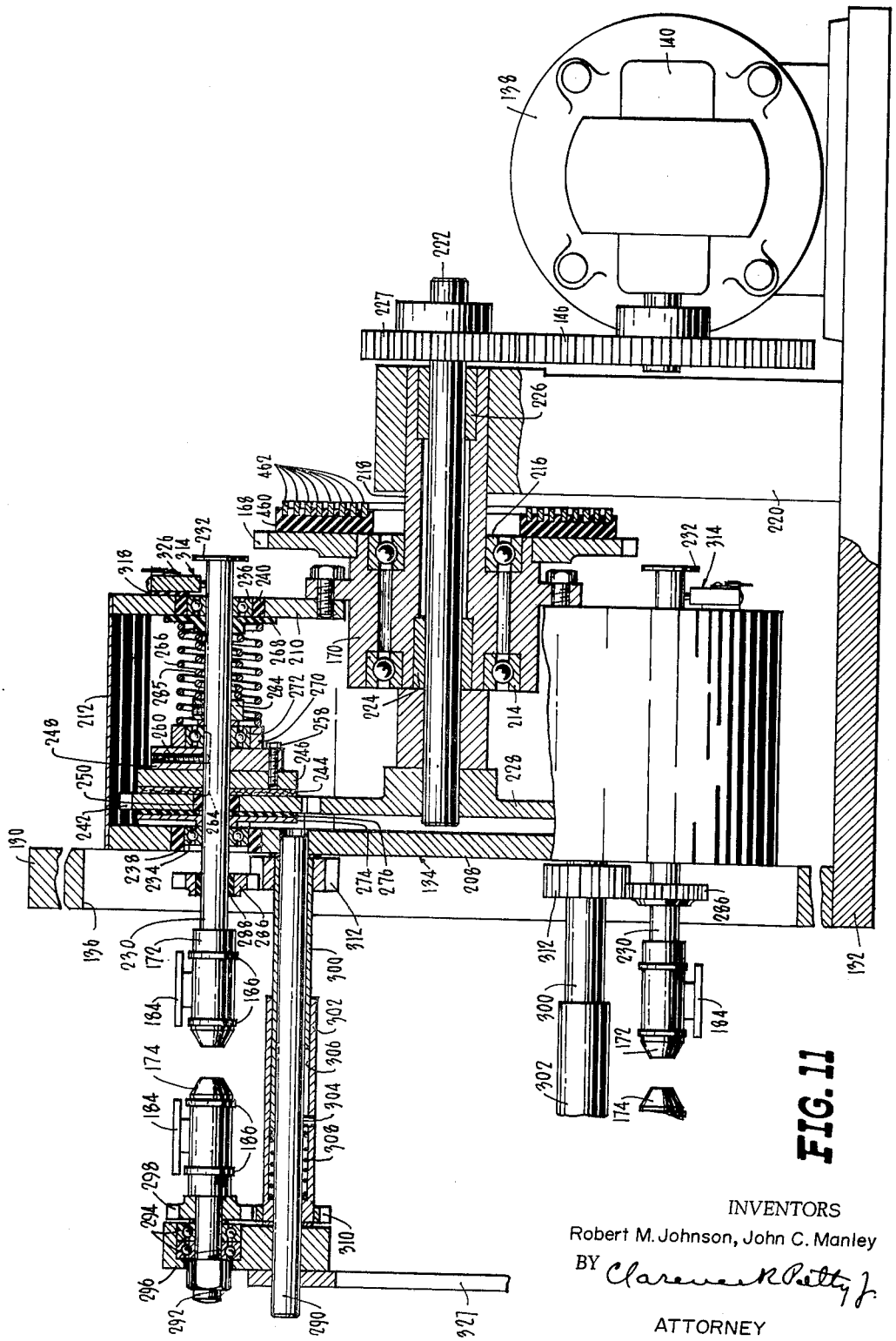

INVENTORS
Robert M. Johnson, John C. Manley
BY Clarence R Patty J.
ATTORNEY

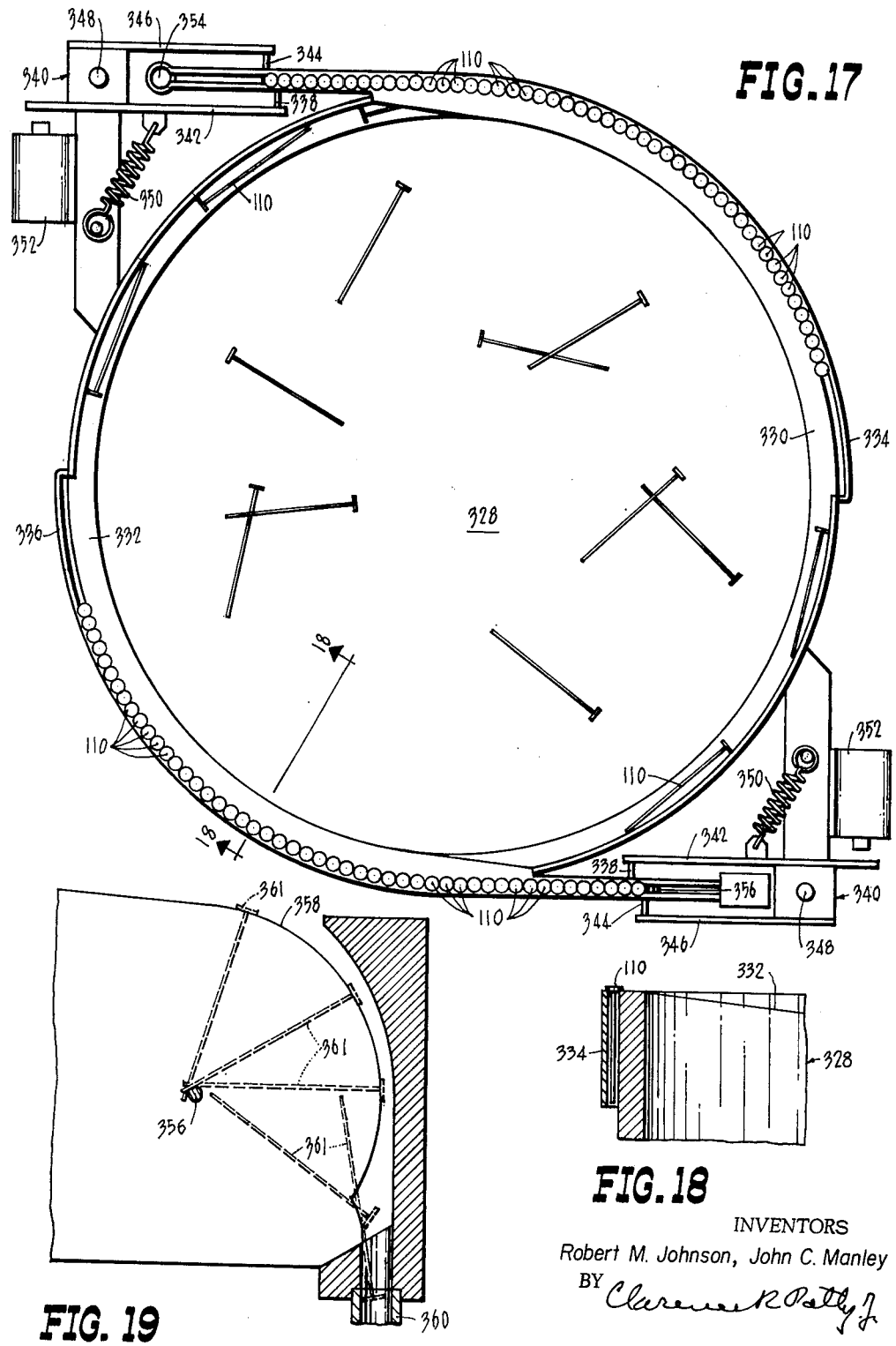

Aug. 17, 1965     R. M. JOHNSON ETAL     3,200,471
APPARATUS FOR MANUFACTURING ELECTRICAL COMPONENTS
Filed Oct. 3, 1963     15 Sheets-Sheet 10

INVENTORS
Robert M. Johnson, John C. Manley
BY
ATTORNEY

Aug. 17, 1965                R. M. JOHNSON ETAL                3,200,471
                 APPARATUS FOR MANUFACTURING ELECTRICAL COMPONENTS
Filed Oct. 3, 1963                                          15 Sheets-Sheet 11

INVENTORS
Robert M. Johnson, John C. Manley
BY Clarence R Petty, Jr.
ATTORNEY

Aug. 17, 1965  R. M. JOHNSON ETAL  3,200,471
APPARATUS FOR MANUFACTURING ELECTRICAL COMPONENTS
Filed Oct. 3, 1963  15 Sheets-Sheet 12

INVENTORS
Robert M. Johnson, John C. Manley
BY
ATTORNEY

Aug. 17, 1965   R. M. JOHNSON ETAL   3,200,471
APPARATUS FOR MANUFACTURING ELECTRICAL COMPONENTS
Filed Oct. 3, 1963   15 Sheets-Sheet 13

INVENTORS
Robert M. Johnson, John C. Manley
BY Clarence R. Petty
ATTORNEY

INVENTORS
Robert M. Johnson, John C. Manley
BY Clarence R. Patty Jr.
ATTORNEY

INVENTORS
Robert M. Johnson, John C. Manley
BY Clarence R. Patty
ATTORNEY

# United States Patent Office 3,200,471
Patented Aug. 17, 1965

3,200,471
APPARATUS FOR MANUFACTURING ELECTRICAL COMPONENTS
Robert M. Johnson, Smethport, and John C. Manley, Bradford, Pa., assignors to Corning Glass Works, Corning, N.Y., a corporation of New York
Filed Oct. 3, 1963, Ser. No. 313,581
34 Claims. (Cl. 29—33)

This invention relates to an apparatus for manufacturing and encapsulating electrical components, such as resistors of the fixed type which utilize glass as the encapsulating material, but is not limited in any way to such applications. For simplicity, the instant invention will be described with reference to electrical resistors, the preferred embodiment.

A known type of electrical resistor having a fixed resistance comprises a resistance element or blank, such as glass cane having an electroconductive film of metallic oxide applied thereto, and leads attached thereto by means of a cap disposed over each end thereof in contact with said film. Such thin film resistors may be spiralled to provide desired characteristics. The resistor is completed by applying an electrically insulating coating of enamel, epoxy resin or other material useful for this purpose.

Such resistors, although suitable for many purposes, are not hermetically sealed. They are subject to resistance drifts with age and are influenced by the environment in which they are used. In addition, due to the termination caps and thick insulating coating, their physical size is large. Furthermore, such coatings usually do not dissipate heat well. Accordingly, an object of this invention is to provide an apparatus for automatic manufacturing of hermetically sealed electrical components.

Another object of this invention is to provide an apparatus which is adaptable to manufacture thin electroconductive film resistors of various physical and electrical sizes.

A further object of this invention is to provide an apparatus for automatic manufacture of hermetically sealed capless resistors having an exterior diameter not significantly larger than the diameter of the resistive element.

A still further object of this invention is to provide an apparatus for automatic manufacture of hermetically sealed electrical components wherein the sealing coating is an adherent glass film.

Still another object is to provide an apparatus for automatic manufacture of hermetically sealed thin electroconductive film resistors which are noted by their high order of accuracy, reproducibility, relatively high selection rate, high power dissipation rate, and high insulation resistance.

A still further object is to provide an apparatus for automatic manufacture of hermetically sealed thin electroconductive film resistors which is noted for its speed, economy and simplicity of construction.

Another object of this invention is to provide an apparatus for encapsulating an electrical component by applying a thin, impervious film of glass thereto by means of a plasma jet torch.

In accordance with the invention, an apparatus for manufacturing electrical components, particularly fixed resistors, comprises eight basic sections and optionally at least four other sections which cooperate to provide finished resistors. The basic sections comprise indexing means for advancing a resistor from one station to another to have desired operations performed thereon, spindle means for holding said resistor and rotating it when desired, component assembling means for feeding individual resistor blanks and leads and disposing them in proper number and position in said spindle means, conductive material application means for providing electrical continuity between said resistor blank and said leads, encapsulation means for applying a thin adherent impervious glass coating to said resistor and for bonding said leads to said resistor blank, annealing means for heat treatment of the applied glass coating, testing means for determining electrical continuity and the resistance of the resistors, and component unloading means for removing the finished resistor from said spindle means. Some optional sections which may be provided to cooperate with the basic sections comprise preheating means to heat said resistor blank and said leads prior to encapsulating, component marking means for applying any desired marks to the finished component, other testing means for determining such parameters as overload, noise, temperature coefficient or the like as may be desired, and sorting means for separating acceptable components by values and tolerances thereof, or into groups according to their electrical characteristics. As will be hereinafter described, other optional sections may also be provided.

The apparatus of this invention comprises a machine head, rotatable in a vertical plane about its own axis, said head embodying eight spindles rotatable with said head about said head axis and additionally, independently and simultaneously being secondarily rotatable about their own longitudinal axis. The machine head is responsive to indexing means or an intermittent motion device for obtaining a series of dwells in the rotating motion of said head. There are eight substantially equally spaced dwells for each revolution of said head, the position of said head during each of said dwells being predetermined to correspond the rotatable spindle positions to the positions of various means disposed about said head, so that desired operations may be performed on each resistor or the parts thereof at each said position, said dwells being of sufficient duration to permit each said desired operation to be performed.

The indexing means comprise a power source, means for obtaining a series of dwells of an output shaft at a predetermined time and in a predetermined position, power transmission means, and means for locking said output shaft in a desired position. The machine head is connected to said output shaft of said indexing means.

The spindle means comprise eight pairs of opposing chucks for holding a resistor or the parts thereof, each pair of chucks having means for maintaining the resistor parts in place, means for rotating each chuck of each said pair at the same speed and in the same direction about its longitudinal axis, means for individually stopping the rotation of each pair of chucks in a desired position relative to each other and to the machine head, and power transmission means.

The component assembling means comprise lead feeder means for feeding a pair of leads for each resistor blank, resistor blank feeder means for feeding the resistor blank to said chucks, means for guiding each of said pair of leads to a proper position for loading, means for loading one lead in one of the spindle chucks, means for loading the other lead in the opposing spindle chuck, means for clamping said leads in said chucks, and means for loading the resistor blank between said leads.

The conductive material application means comprise a reservoir of powdered conductive material, means for applying the powder to the junction of the resistor blank and each of its leads, means for feeding said powdered conductive material in controlled amounts when desired, and means for masking the central position of said resistor blank to prevent the conductive material to be applied thereon. The powdered conductive material may be applied as a frit or in molten form. It provides electrical continuity between the resistor blank and the leads.

The encapsulation means comprise a reservoir of powdered encapsulating material, plasma jet means for applying the encapsulating material in molten form to the resistor blank and a portion of the leads, means for feeding said powdered encapsulating material to said plasma jet means in controlled amounts when desired, and traversing means for moving said plasma jet means along the length of the resistor blank. The encapsulating material is applied in the form of molten particles that impinge on the surface of said resistor blank and a portion of said leads. Sufficient heat is transferred from said molten particles to the conductive material to fuse frit when such is used. Also, sufficient heat is transferred to the metallic leads to fuse them to the resistor blank when the leads are provided with suitable fusible material at the portions adjacent said resistor blank. The particles also retain sufficient heat to remain in molten form until they can flow together to form a thin continuous film.

The annealing means comprise heating or cooling means for annealing the encapsulating material in accordance with a predetermined desired schedule.

The testing means comprise electrical circuit means and resistance measuring and indicating means for measuring and indicating the resistance of the resistor while it is being encapsulated and while the coating is being annealed.

The component unloading means comprise means for individually stopping the rotation of each pair of chucks in a desired position relative to each other and to said machine head, means for releasing or unclamping said resistor leads from said chucks, means for removing the finished resistor from the spindle means, and means for depositing the finished resistor in a desired place. When it is desired to sort the resistors according to values, tolerances or into groups according to desired electrical characteristics, or to simply reject defective resistors, a sorting means may be provided in conjunction with the unloading means.

Additional objects, features, and advantages of the present invention will become apparent to those skilled in the art, from the following detailed description and the attached drawings on which, by way of example, only the preferred embodiments of this invention are illustrated.

FIG. 9 is a cross-sectional elevation of the spindle chucks of this invention illustrating the lead clamps and clamp magnets.

FIG. 10 is a cross-sectional view of one of the chucks of FIG. 9 taken along line 10—10 of FIG. 9 illustrating the lead clamp and lead in position.

FIG. 11 is a cross-sectional view of the spindle clutch and rotation means illustrating the relationship thereof with the indexing means.

FIG. 14 is an elevation of the spindle brush arrangement by means of which electrical contact is made with one of the inner chucks from a suitable source.

FIG. 17 is a plan view of the vibratory feeder for feeding resistor leads to the lead guide assembly wherein the leads are fed along two tracks.

FIG. 18 is a cross-sectional view of the lead track outside of the vibratory feeder of FIG. 17 taken along lines 18—18 thereof.

FIG. 19 is a cross-sectional view of the lead flip-over means for feeding one of the two resistor leads head first.

Because of the complexity of the apparatus of this invention the subsequent description of substantially one embodiment thereof is arranged in the following outline form:

I. General Description
  II. Indexing Means
  III. Spindle Means
    A. Spindle Rotation Means
  IV. Component Assembling Means
    A. Lead Feeding and Loading Means
    B. Blank Feeding and Loading Means
  V. Conductive Material Application Means
    A. Masking Means
  VI. Encapsulation Means
    A. Traversing Means
  VII. Annealing Means
  VIII. Testing Means
    A. Slip Ring Means
  IX. Component Unloading Means
  X. Optional Means
    A. Marking Means
    B. Other Testing Means
    C. Component Sorting Means
  XI. Electrical Circuitry
    A. In General
    B. Control Circuitry
    C. Testing Circuitry

I. GENERAL DESCRIPTION

Figure 1:
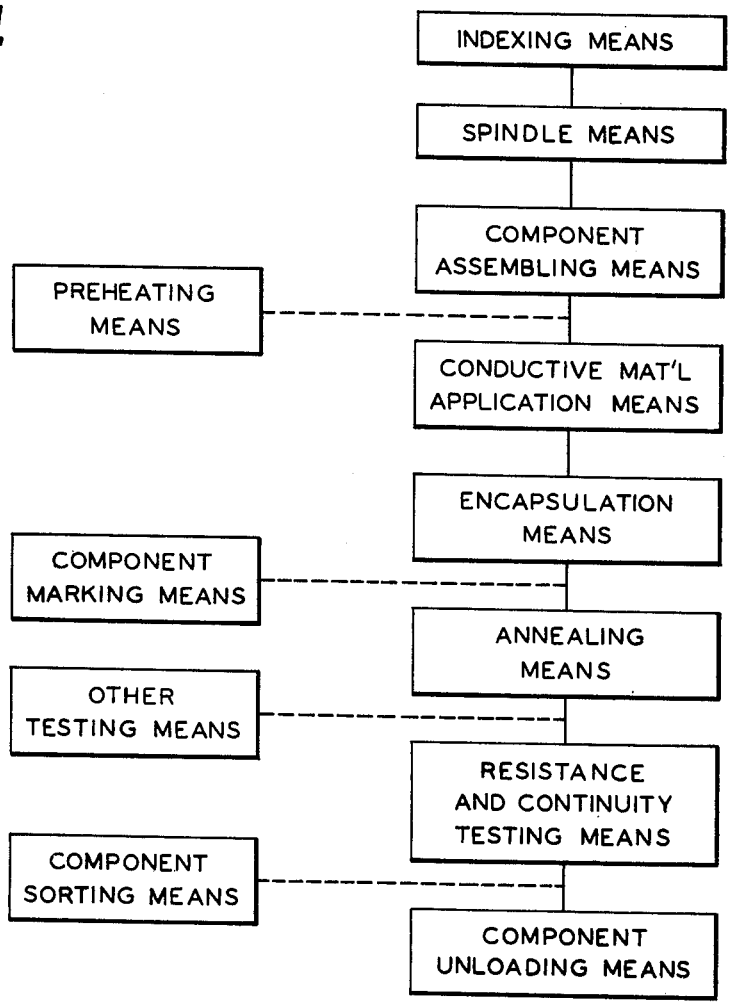
FIG. 1 is a block diagram showing the various sections of an apparatus constructed in accordance with this invention.
Figure 2:
FIG. 2 is an exploded elevation illustrating the various parts or components to be assembled to form a resistor according to this invention.

Referring now to the drawings, FIG. 1 shows in block diagram form apparatus constructed in accordance with the invention and comprising indexing means, spindle means, component assembling means, conductive material application means, encapsulation means, annealing means, resistance and electrical continuity testing means, and component unloading means. Pre-heating means, component masking means, other testing means and component sorting means are also shown and may be incorporated in said apparatus when desired. Resistor parts are illustrated in FIG. 2 and comprise a pair of leads 110, and resistor blank 114. Leads 110 are provided with suitable blank contacting ends such as discs 116, to which discs a layer 120 of suitable bonding material is applied. As hereinafter used, the term lead will mean a lead with a disc or a suitable resistor blank contacting end and bonding material adhered thereto. The resistor blank 114 may be formed of a cylindrical dielectric substrate, such as glass, upon which an electroconductive film 122 of metallic oxide or the like is deposited. The electro-conductive metal oxide film 122 may be spiralled to provide desired electrical characteristics. Layer 120 of bonding material may be a thin film of glass, adhered or fused to disc 116 and thereafter fused to the resistor blank glass substrate as hereinafter described. A resistor suitable for production by the apparatus of this invention is described in a patent application filed concurrently herewith by J. C. Manley, Serial No. 313,513, entitled "Electrical Component and Method."

The apparatus of one embodiment of this invention embodies eight rotatable spindles mounted on a rotatable machine head. The head is rotated by the indexing means which advance the spindles through eight operation stations and provide a dwell period at each station. The eight operation stations may be described as follows: component parts loading station, preheating station when desired, conductive material application station, encapsulating material application station, three encapsulating material annealing stations, and a component unloading station. As will be hereinafter described in detail, the annealing stations may also concurrently serve as testing, marking and sorting stations.

The component assembling means feed a pair of resistor leads from a supply thereof to the spindle means. Referring again to FIG. 2, since the leads are not the same at both ends, the component assembling means must feed one of leads 110 in one position and the other of leads 110 in an opposing position. Said pair of leads 110 are then guided to and are positioned in a pair of chucks which form a part of the spindle means which hold the resistor parts during the entire resistor fabrication cycle, that is as the resistor advances through the various stations described above. The component assembling means then feeds, guides and loads a resistor blank 114, between said pair of leads 110 within said spindle means completing loading of the resistor parts. While the resistor parts are loaded in said chucks, said chucks are locked in place and are not rotating. After the parts are loaded, the chucks are unlocked and rotated while said indexing means index said machine head advancing all of said pairs of chucks. Said chucks are rotated about their longitudinal axis throughout the entire fabrication cycle except during parts loading and resistor unloading. The loaded resistor parts are advanced to the second station.

Figure 5:
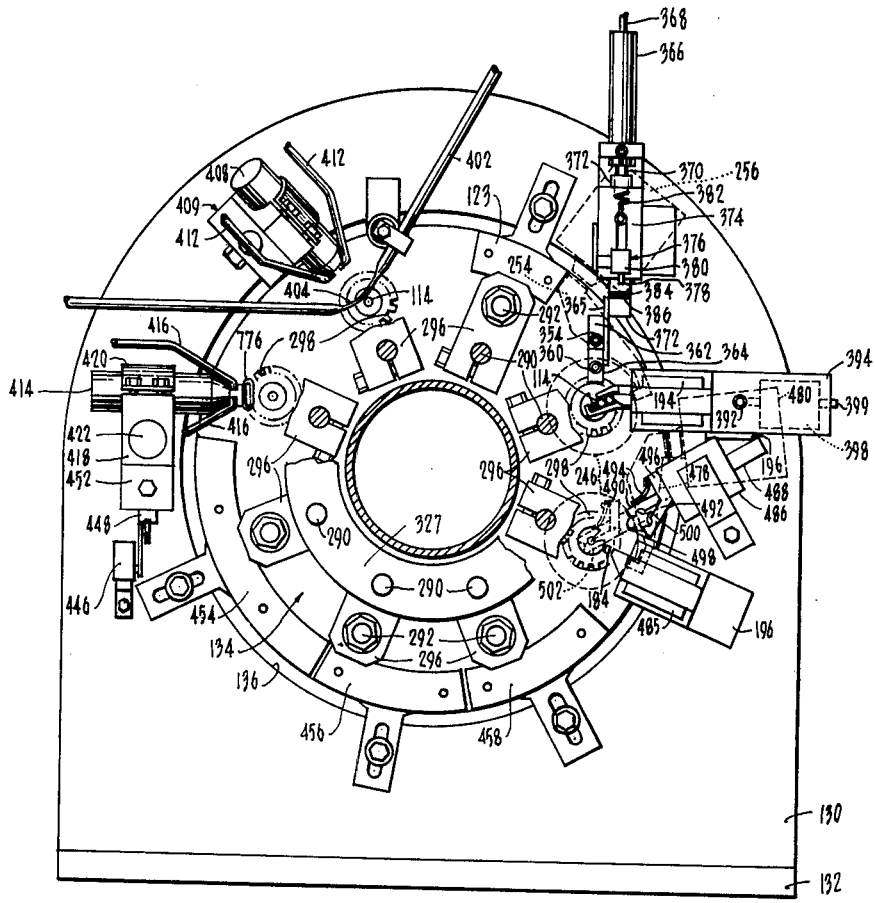
FIG. 5 is a front elevation of the machine of this invention.

When the resistor being fabricated or the materials thereof require preheating, as hereinafter described, such preheating is performed at the second station by means of heater 123 as shown in FIG. 5. The resistor is then advanced, as described above, to the third station.

Figure 3:
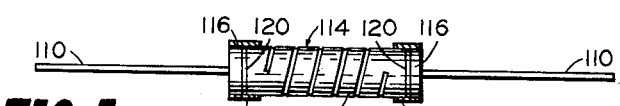
FIG. 3 is an elevation illustrating a subassembly of the various components of FIG. 2 illustrating electrically conductive bands which have been applied to provide electrical continuity between the resistive film and the leads.

Electrical continuity between the resistor blank 114 and leads 110 is obtained by disposing a mask or shield over the central portion of resistor blank 114 and applying a thin continuous band 124 of conductive material to the junctions between leads 110 and blank 114, that is over each unshielded end of blank 114 and discs 116, as illustrated in FIG. 3. Such conductive material may be a silver frit in a suitable vehicle or binder, sprayed molten silver, or the like.

Figure 4:
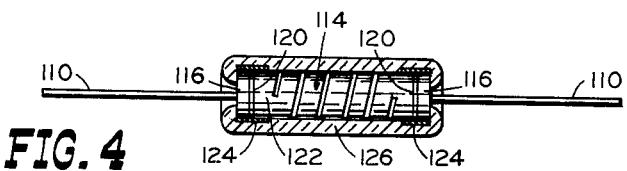
FIG. 4 is a cross-sectional elevation of a typical finished resistor formed by the apparatus of this invention.

As shown in FIG. 4, at the encapsulating material application station a continuous coating 126 of impervious dielectric material, such as glass, is applied to the resistor blank 114 and extending over discs 116. The glass coating 126 is applied by plasma jet means in the form of molten particles which impinge on the surface of resistor blank 114. Sufficient heat is transferred from the molten particles to fuse the silver frit of bands 124 when said bands are formed of frit and also to fuse the glass of layers 120 to the glass substrate of blank 114 when said layers are formed of glass. Said particles remain in molten form until they flow together to form a thin continuous coating 126.

To obtain an unstrained and uncracked glass coating 126 on the resistor, the coated resistor is annealed at the three following stations. While the glass coating is being annealed the resistor may be suitably marked by a marking means. The electrical continuity of the resistor, as well as its resistance, is sensed and indicated while the resistor passes through the annealing stations. When it is desired, other tests may be performed or characteristics may be measured and indicated during said annealing.

At the unloading station, said chucks are locked in place and the resistor is unclamped. The finished resistor is then removed from said chucks and is deposited in a desired receptacle. If means for sorting resistors are provided, the finished resistor would be deposited in one of a plurality of bins depending on the measured characteristics, values or tolerances of the resistor. This completes one cycle and said machine head is then indexed and said chucks are advanced to the component parts loading station to begin the next cycle.

Figure 6:
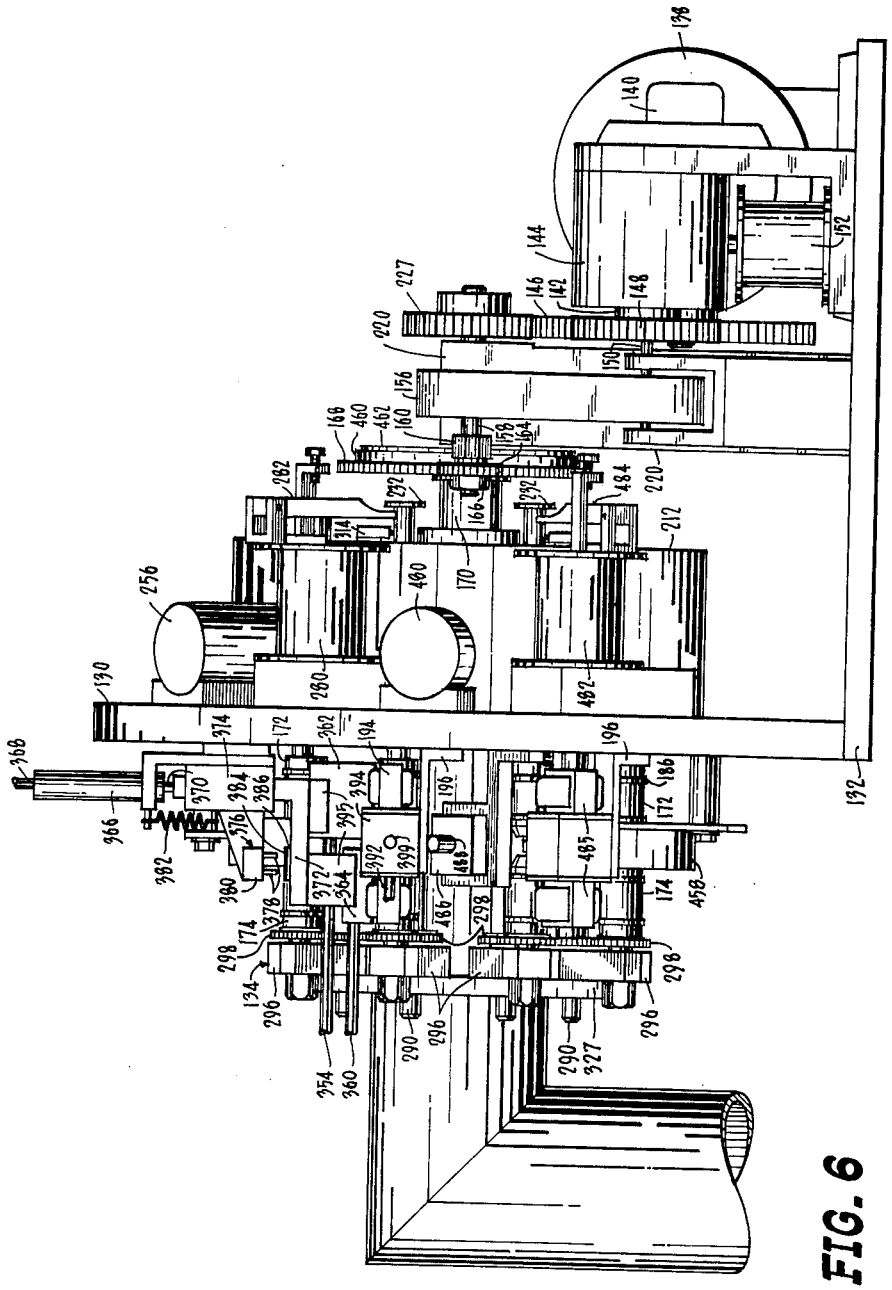
FIG. 6 is a side elevation of the machine of this invention.
Figure 7:
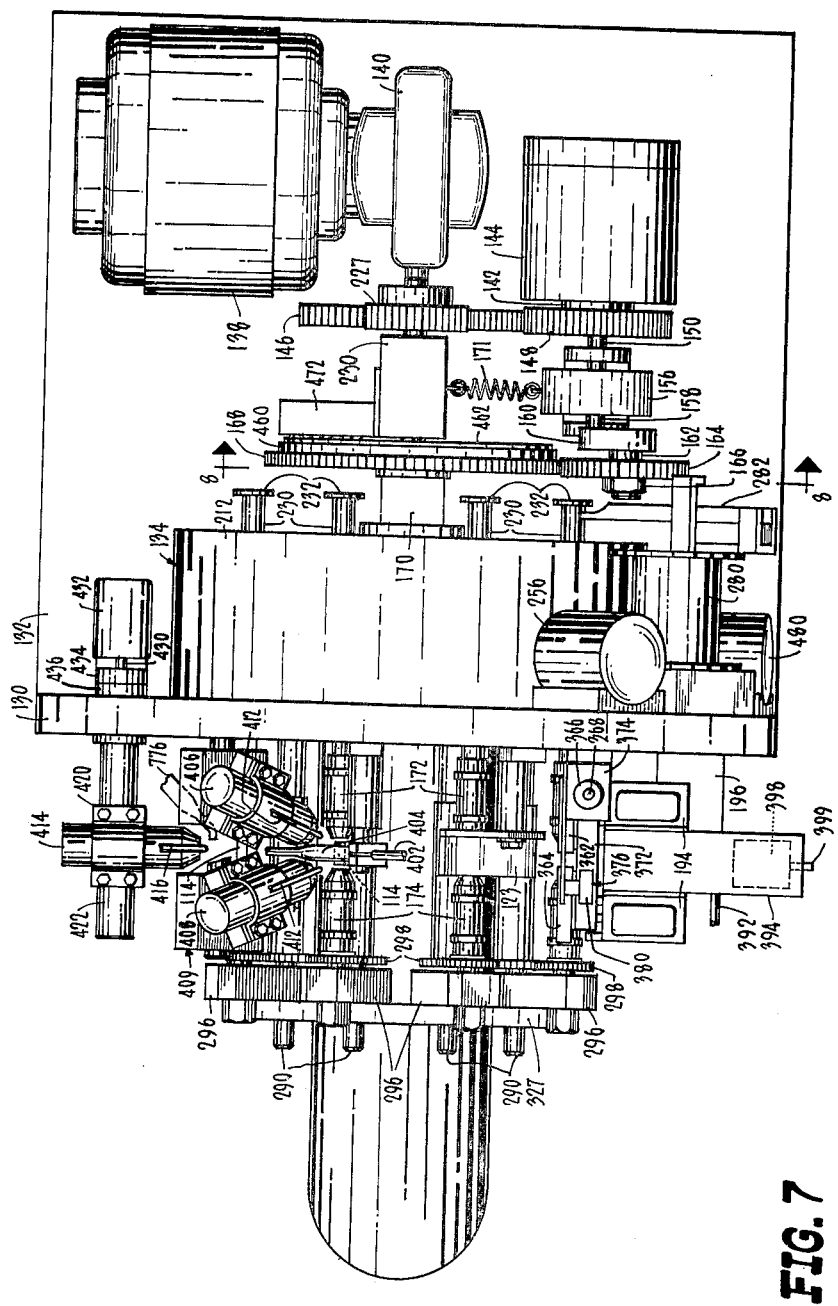
FIG. 7 is a plan view of the machine of this invention.

Referring now to FIGS. 5, 6, and 7, it is seen that vertical support plate 130 is rigidly fixed to base 132. The machine head, generally indicated by numeral 134, is disposed within aperture 136 by plate 130. Drive motor 138, through speed reducer 140, drives the indexing means for rotating head 134 through the several stations, and also rotates the spindles. The means for performing the desired functions at the various stations are mounted to plate 130.

The general arrangement and purpose of the apparatus of this invention having been described, each of its components will now be described in detail.

II. INDEXING MEANS

An indexing means is an intermittent motion device which provides a dwell or a series of dwells in the output thereof from a continuously rotating input shaft. Many designs of intermittent motion devices are known to the art and a suitable one may be readily selected. An intermittent motion device particularly suitable for use in connection with the instant invention is described in U.S. patent application, serial No. 211,658, filed July 23, 1962 by J. C. Manley entitled, "Intermittent Motion Device."

Figure 8:
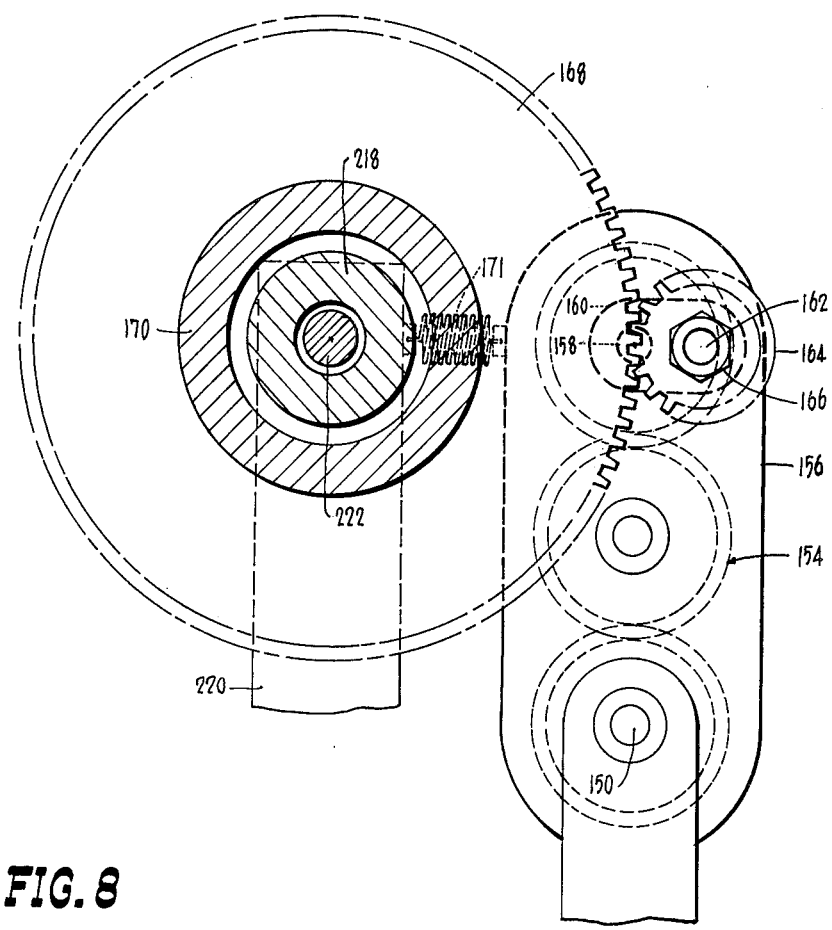
FIG. 8 is an elevation of a detail of the indexing means taken along line 8—8 of FIG. 7.

Referring now to FIGS. 6, 7, and 8 it is seen that drive motor 138 continuously drives the input shaft 142 of single revolution clutch 144 through gears 146 and 148. Single revolution clutch 144 causes a single revolution of output shaft 150 thereof from continuously rotating input shaft 142 upon engagement of said clutch by indexing solenoid 152. Solenoid 152 is actuated by an electrical signal or impulse at a predetermined desired time from a source hereinafter described. Such clutches may also be engaged by suitable mechanical, pneumatic or the like signals. Rotational motion transmitting means, such as a gear train, generally indicated by reference numeral 154, are responsive to said shaft 150 by direct connection thereto and by fixed co-acting relationship of the components thereof by embodiment within pivot arm 156. Shaft 150 is carried by pivot arm 156 by means of bearings, not shown, to allow rotation of shaft 150 within arm 156 and to allow pivoting of said arm itself. Although the rotational motion transmitting means are illustrated as a gear train, they may also be a chain or belt drive or the like. The output from said transmitting means is supplied by shaft 158 which is also carried by pivot arm 156 by bearings, not shown. Connecting member 160, having protrusion 162, is fixedly mounted to said shaft 158 by means not shown, and gear 164 is fixedly mounted to said protrusion 162 by suitable means, such as nut 166. Gear 164 meshes with and drives gear 168 which is mounted on coupling 170 through which head 134 is indexed or rotated. Gears 164 and 168 are maintained in a meshing arrangement by suitable means, such as spring 171.

Upon a predetermined signal to solenoid 152, clutch 144 is engaged rotating shaft 150 one revolution, which rotation is transmitted through gear train 154, which has an overall gear ratio of 1:1, causing shaft 158 to rotate one revolution. Since gear 164 is fixedly mounted to shaft 158, through connecting member 160, it will revolve once causing gear 168 and coupling 170 to rotate through a distance proportional to the ratio of the number of teeth in said gears 164 and 168.

Gear 164 and connecting member 160 are fixed to shaft 158 and disposed so that during the dwell period the central axis of shaft 158 will perpendicularly intersect the pitch circles of both gears 164 and 168. This arrangement provides self-locking of gear 168 and consequently coupling 170 and head 134.

It is readily seen that the number of dwell positions or operation stations of head 134, can be easily preset and changed. The number of dwells of head 134, is determined by the gear tooth ratio of gears 164 and 168, when the ratio of input to output of gear train 154 is maintained at 1:1. Therefore, the number of dwells may be readily changed by changing either one or both of gears 164 and 168, thereby changing said gear tooth ratio.

It is also readily seen that the dwell time of coupling 170 and head 134 is independent of the motion of clutch input shaft 142, since the intermittent motion and consequently the dwell time of head 134 is determined by a schedule of signals applied to solenoid 152 causing output shaft 150 of clutch 144 to rotate one revolution.

III. SPINDLE MEANS

The construction and operation of the spindle means will be described with reference to FIGS. 9 and 10. It is understood that reference is made to FIGS. 5, 6, and 7 throughout the specification in connection with the description of the various mechanical sections of this invention.

The spindle means comprise eight rotatable spindles, each having two chucks, the inner chucks being generally indicated by the numeral 172, and the outer chucks being generally indicated by the numeral 174. The rotatable spindles are mounted on rotatable machine head 134 substantially equidistant from each other in a circular pattern. Each pair of chucks is identical with the rest, therefore, for convenience, the description of the rotatable spindles will be confined to one pair of chucks and means associated with them.

Chucks 172 and 174 comprise a body 176 having aperture 178 and channel 180 formed therein. Aperture 178 is an elongated slot formed along a radius of said chuck body 176 extending to substantially the center thereof. Channel 180 is substantially a V type opening also extending to the center of chuck body 176. At the bottom of said channel 180 coincident with the center of said chuck body 176, a lead groove 182 is formed. Groove 182 also forms the bottom of aperture 178. A lead clamp 184 is disposed within the aperture 178 and is held in position by two circular springs 186, which are disposed within grooves 188 in body 176. Springs 186 extend substantially around body 176, except over channel 180, and exert a force on shoulders 190 of clamp 184 to maintain clamp 184 within aperture 178.

Leads 110 are fed to a pair of chucks by means hereinafter described and one lead is disposed within each lead groove 182 of said pair of chucks. As the leads are fed to said chucks, electro-magnets 194 fixedly mounted to support plate 130 through resistor blank feeding means hereinafter described and support member 196, are energized from a source and by means hereinafter described, and cause lead clamp 184 to be partly withdrawn from aperture 178. Lead clamp 184 is withdrawn from aperture 178 until clamp head 198 comes to rest against pole 200 of magnet 194. Magnets 194 are positioned so that when lead clamp 184 is withdrawn from aperture 178, to the position illustrated by dotted lines 202, the lower portion of lead clamp 184 will be withdrawn from lead groove 182. After leads 110 are loaded in said chucks within lead grooves 82, electric current to electromagnets 194 is discontinued and springs 186 cause lead clamps 184 to press against leads 110 maintaining them within grooves 182. The force applied to leads 110 by clamps 184 is of a magnitude sufficient to maintain the leads within groove 182 but is insufficient to keep said leads from sliding longitudinally in said groove. As will be hereinafter described, when leads 110 are fed to chucks 172 and 174, inner chuck 172 is caused to be retracted or moved away from chuck 174 along its longitudinal axis enabling a resistor blank, as indicated by dotted lines 204, to be fed between the pair of leads. After said blank is positioned between said leads, chuck 172 is returned to its normal operating position thereby causing said blank to be clamped between said leads. When leads 110 are longitudinally misaligned within grooves 182, they will be caused to slide longitudinally within said grooves as chuck 172 is returned from its retracted position, until the end of each lead comes in contact with its respective lead stop 206. Lead stop 206 is fixedly mounted within channel 180, by means not shown, such as for example a machine screw, at a predetermined desired position. Such position is determined by the length of the leads and the length of the resistor blank.

A. *Spindle rotation means*

The construction and operation of the spindle rotation means will be described with the additional reference to FIG. 11.

A part of machine head 134 is enclosed within a spindle drive and clutch housing comprising forward wall 208, rear wall 210 and shell 212. As hereinbefore described, the indexing means cause head 134, including the plurality of pairs of spindles to advance from one operation station to the next, so that desired operations may be performed at each said station. The indexing means cause head 134 to rotate through an angular displacement substantially equal to the angular distance between said spindles. The driving gear 164 of said indexing means engages gear 168, which gear 168 is fixedly mounted to coupling 170. Coupling 170 is carried by bearings 214 and 216, which bearings are carried by sleeve 218. Sleeve 218 is rigidly mounted within support 220. Drive shaft 222, which transmits power from speed reducer 140, is supported by bearings 224 and 226 within sleeve 218. Shaft 222 is driven by drive motor 138, through speed reducer 140 and gears 146 and 227, within sleeve 218 and rotates the several spindles as hereinafter described, while coupling 170 rotates about sleeve 218 in response to the indexing means. Spindle driving gear 228 is fixedly mounted to shaft 222.

Inner chuck 172 is rigidly fixed to one end of spindle shaft 230. A spindle retract engagement plate 232 is mounted at the other end of shaft 230. Shaft 230 is slidably carried by bearing 234 within wall 208 and bearing 236 within wall 210. As will be hereinafter described, inner chuck 172 is electrically insulated from outer chuck 174 so that an electrical potential may be placed across an electrical component held by said chucks. Bearing 234, and consequently shaft 230, is electrically insulated from wall 208 by sleeves 238 of suitable insulating material which is disposed between said bearing and said wall. Bearing 236, and consequently shaft 230, is also electrically insulated from wall 210 by sleeve 240 disposed between said bearing and said wall, which sleeve 240 is formed of electrically insulating material.

Figures 12, 13:
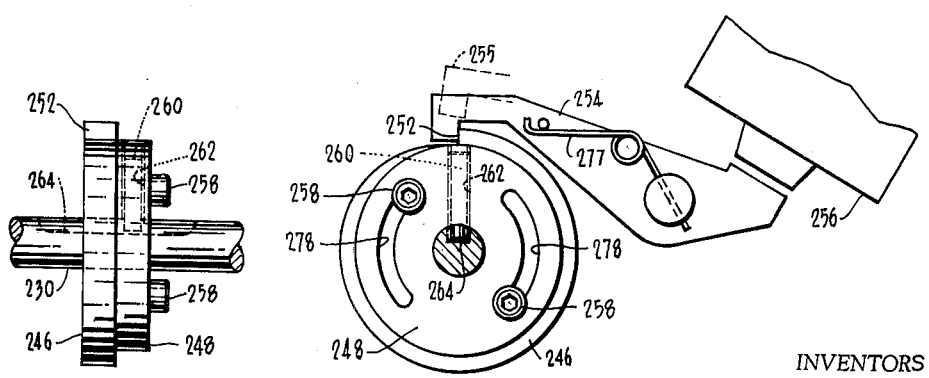
FIG. 12 is an elevation of the pressure plate of the spindle clutch illustrated in FIG. 11.
FIG. 13 is an elevation of the means for stopping the chuck rotation illustrating the solenoid, clutch pressure plate, and the pressure plate engagement arm.

Disposed about shaft 230 intermediate walls 208 and 210 is an electrically insulated clutch assembly comprising a floating gear 242, clutch plate 244 of friction material, clutch pressure plate 246, pressure plate hub 248, and means for maintaining said clutch engaged. Floating gear 242 is electrically insulated from shaft 230 by sleeve 250 of electrically insulating material. Gear 242 and sleeve 250 have a sliding fit with shaft 230 so that gear 242 can rotate about shaft 230 without transmitting power thereto. Electrically non-conducting friction material plate 244 is disposed about shaft 230 with one flat surface thereof adjacent one surface of gear 242. The clutch pressure plate assembly comprising the clutch pressure plate 246 and pressure plate hub 248, as shown additionally in FIG. 12, is slidably disposed about shaft 230 with pressure plate 246 adjacent the other flat surface of friction material plate 244.

Pressure plate 246 is formed with a shoulder 252 at the periphery thereof. As seen additionally in FIG. 13, a pivot arm 254 is pivoted from a position indicated by dotted lines 255 to engage shoulder 252, when electromagnet 256 is energized as hereinafter described. When shoulder 252 is so engaged, rotation of pressure plate 246 is stopped. Pressure plate hub 248 is mounted to said pressure plate by means of machine screws 258. Set screw 260 is disposed within threaded hole 262 of hub 248 so that when said pressure plate assembly is slidably disposed about shaft 230, set screw 260 extends into keyway 264 formed in said shaft. Said pressure plate assembly can slide along shaft 230 to the extent that set screw 260 slides within keyway 264.

The clutch pressure plate 246 and floating gear 242 engage friction plate 244 by force applied by clutch spring 266. Clutch spring 266 is electrically insulated from wall 210 by insulating member 268, and it exerts a force through stationary member 270 which is carried by shaft 230 through bearing 272. Bearing 272 is slidably carried by shaft 230. Floating gear 242 is maintained and insulated from wall 208 by thrust washer 274 and electrically insulating washer 276.

Inner chuck 172 is rotated by power transmitted to shaft 230 from drive motor 138 through gears 146 and 227, shaft 222 and driving gear 228 which driving gear 228 is in engagement with floating gear 242. Floating gear 242 is constantly rotating about shaft 230. When the spindles are at any station other than the component parts loading station or the component unloading station, the spindles are constantly rotating. This is accomplished by transmission of power from constantly rotating floating gear 242 through friction material plate 244 to clutch pressure plate 246. Since plate 246 is secured to hub 248, which hub can slide along shaft 230 but cannot rotate about said shaft due to set screw 260, shaft 230 is rotated by force transmitted through said set screw 260. At the component parts loading station and component unloading station shaft 230 is stopped so that parts can be loaded into said chucks or a finished resistor unloaded therefrom. Referring again to FIG. 13, said shaft rotation is stopped by electrically energizing magnet 256, as hereinafter described, which causes pivot arm 254 to engage shoulder 252 of pressure plate 246. Since shaft 230 is connected to pressure plate 246 by set screw 260, said shaft will stop when shoulder 252 is engaged by pivot arm 254. At this time, floating gear 242 will merely rotate about stationary shaft 230. When electro-magnet 256 is de-energized, pivot arm 254 is caused to return to its normal position as indicated by dotted lines 255, by spring 277.

Since shaft 230 must be stopped at two stations, an electro-magnet and a pivot arm, as described, must be provided at each of said stations as shown in FIGS. 5, 6, and 7. To stop shaft 230 and consequently chuck 172 in the correct position for loading and unloading, said electro-magnets and pivot arms must be suitably positioned. In addition, as shown in FIGS. 12 and 13, shoulder 252 of pressure plate 246 may be suitably adjusted and positioned with reference to the stopped position of shaft 230 by means of machine screws 258 and slots 278 in hub 248. The position of shoulder 252 may be changed with respect to shaft 230 to the extent of the adjustment permitted by slots 278.

As heretofore noted, inner chuck 172 is retracted, that is, caused to move away from outer chuck 174 along the longitudinal axis thereof, during the component parts loading step. This is accomplished by electrically energizing retract electro-magnet 280, as hereinafter described, causing retract pivot arm 282 to engage retract engagement plate 232 on shaft 230, thereby pulling shaft 230 to retract chuck 172. As chuck 172 is retracted, collar 284, fixedly mounted to shaft 230, causes retract spring 285 to compress. When electro-magnet 280 is de-energized, spring 285 returns chuck 172 and shaft 230 to its predetermined operating position. The longitudinal position of shaft 230 and consequently the spacing between chucks 172 and 174 is determined at least in part by the position at which collar 284 is fixed to shaft 230. As chuck 172 and shaft 230 is retracted and returned, the pressure plate assembly remains substantially in the same place since set screw 260 slides within keyway 264.

Intermediate forward wall 208 and inner chuck 172, drive gear 286 is fixedly mounted to shaft 230 through electrical insulating material collar 288. Outer chuck support member 290 is rigidly mounted at one end to wall 208, substantially parallel to shaft 230. Outer chuck 174 is rigidly fixed to outer chuck shaft 292 which is carried by bearings 294 within outer chuck clamp 296. Chuck clamp 296 is secured to the other end of support member 290. Outer chuck gear 298 is rigidly fixed to shaft 292 intermediate outer chuck 174 and clamp 296. A spring loaded telescoping shaft comprising inner shaft 300 and outer shaft 302 is disposed about support member 290 in a rotatable engagement thereabout. Force is transmitted from inner shaft 300 to outer shaft 302 by pin 304 fixed to said outer shaft and extending into slot 306 within said inner shaft 300. Spring 308 maintains shafts 300 and 302 in proper operating position. Gear 310 is fixed to the forward end of shaft 302 in engagement with outer chuck gear 298, while gear 312 is fixed to the rear end of shaft 300 in engagement with drive gear 286. As shaft 230 and inner chuck 172 are being driven by gear 228 through the clutch system heretofore described, outer chuck 174 and shaft 292 are also being driven by gear 228 through gears 286 and 312, telescoping shafts 300 and 302 and gears 310 and 298. The gear tooth ratio between each set of gears 310 and 298 as well as 286 and 312 is maintained at 1:1, therefore, when inner chuck 172 is rotating, outer chuck 174 is also rotating in the same direction and at the same speed. When inner chuck 172 is stopped for loading and unloading, as hereinbefore described, outer chuck 174 is also stopped since it is directly connected to the same driving source. To allow chuck 172 to be retracted while gears 286 and 312 remain engaged, gear 312 is formed having a width sufficient to accommodate the distance through which gear 286 moves when said chuck is retracted.

Outer chuck 174 is electrically at the same potential as ground or the machine support 130 and base 132. Inner chuck 172 is insulated from ground and outer chuck 174 by the various electrical insulating members, washers, and the like, hereinbefore described. Inner chuck 172 is electrically connected to a suitable electrical source by the brush assembly generally indicated by reference numeral 314. Referring additionally to FIG. 14, brush assembly 314 comprises housing 316 which is mounted to wall 210 and insulated from it by electrical insulating member 318 and insulating material sleeves 320, through which housing and sleeves mounting screws 322 pass. Spring loaded brushes 324 are disposed within and held by housing 316 in electrical contact with shaft 230. Brushes 324 are suitably connected to an electrical source, as hereinafter described, by connection to contact screw 326 on housing 316.

As heretofore noted, the spacing between inner chuck 172 and outer chuck 174 is maintained in part by the position of collar 284. This spacing is also controlled in part by the location of clamp 296 on support member 290. As the position of clamp 296 on support member 290 is changed, said telescoping shaft expands and contracts to compensate for the changes. Outer support ring 327, for supporting the other end of members 290 and in turn outer chucks 174, is fixedly mounted to the several outer chuck support members 290, and clamps 296.

IV. COMPONENT ASSEMBLING MEANS

The component assembling means are conveniently positioned about the spindles when said spindles are at the component parts loading station and comprise lead feeding and loading means, and element feeding and loading means. When the indexing means rotate a pair of empty chucks, to said loading station, the chuck rotation is stopped, they are locked in the loading position, and thereafter the inner chuck is retracted as hereinbefore described. Concurrently, a pair of leads are fed to the chucks and a resistor blank or element is fed and positioned between the chucks substantially coaxially therewith, to be in position to be gripped by the leads when the inner chuck is released. After the inner chuck is released and the component parts are held by and between the chucks, said chucks are unlocked and caused to rotate about their longitudinal axis and are indexed to the next station for the following operation.

A. *Lead feeding and loading means*

Referring now to FIG. 17, a supply of leads 110, having a disc with bonding material applied thereto at one end as hereinbefore described, are disposed in a vibratory parts feeder 328. The disc end of the lead will hereinafter be referred to as the head of the lead. Vibratory parts feeders and their basic operation are well known in the art and a suitable one can be readily selected by one familiar with the art to feed leads to the exit thereof at a predetermined desired rate. The vibratory lead feeder illustrated in FIG. 17, is provided with dual internal feed tracks 330 and 332 having exits disposed at approximately 180° from one another. Leads 110 are caused to be conveyed along each of said tracks to the top thereof in a substantially horizontal position. Referring additionally to FIG. 18, at the top of feeder 328 the wire portions of said leads are caused to drop into openings defined by guides 334 and 336 positioned adjacent tracks 330 and 332 respectively. Since said openings are not as wide as the lead heads, the leads hang by the heads as the wire portion drops into said openings. The leads are then conveyed to the ends of guides 334 and 336 in the vertical position. From the ends of guides 334 and 336, the leads are fed to the spindles.

At the end of guides 334 and 336, the leads are caused to collect in the vertical position until they are fed to the chucks at a predetermined desired time. As heretofore noted, the leads must be fed to the chucks with the heads thereof facing one another so that the resistor blank may be gripped between them. From guide 334 the leads are fed to the inner chuck 172, while from guide 336 the leads are fed to outer chuck 174. To feed the leads from each said guide to each said chuck one at a time, a pivotally mounted feed arm is provided comprising pin 338 fixedly mounted to one side of pivot member 340 through support 342, and pin 344 fixedly mounted to the other side of pivot member 340 through support 346. Pin 344 normally extends across opening of said guide to prevent the leads from being conveyed to the end thereof, therefore it holds back the supply of leads. Pin 338 is spaced a distance approximately equal to one lead head from pin 344, and is disposed forward of pin 344, that is in the direction from which the leads are fed. Pins 338 and 344 are supported about said guide openings by supports 342 and 346 so that as member 340 pivots about pin 348, only one of the pins spans said guide opening at one time. Pin 344 is disposed across said guide opening at all times except when a lead is being fed to said chuck. This is accomplished by pivoting pivot member 340 to a desired position such that pin 344 is across said guide opening by suitable means such as spring 350. When it is desired to feed a lead to said chuck, electro-magnet 352 is energized from a source and by means hereinafter described. When magnet 352 is energized pin 338 is caused to pivot across the guide opening while pin 344 is pivoted therefrom. Since pin 338 is spaced forward from pin 344 by the distance approximately equal to a lead head, pin 338 holds back the entire supply of leads except the first lead in the guide, which first lead is then free to be conveyed to the guide exit chute 354 by said vibratory feeder 328. When the first lead in said guide is thusly fed to said chuck, magnet 352 is de-energized allowing spring 350 to pivot member 340 and dispose pin 344 across the guide opening thereby allowing the next lead in line of said supply of leads to advance against pin 344 in position to be fed to said chuck at the next signal to magnet 352. The leads from this track are fed in the head last position suitable for loading into inner chuck 172.

Leads must be fed to the outer chuck 174 head first thereby requiring them to be flipped over. Referring additionally to FIG. 19, as a lead is fed to a chute, in the same manner as hereinabove described in connection with chute 354, it contacts lead flipover pin 356 which is disposed within the opening in said guide. Pin 356 holds back the bottom of the lead while the head thereof is caused to advance along curved surface 358, by feeder 328, till the lead drops head first into chute 360 as illustrated by dotted lines 361. The leads are then carried along in chutes 354 and 360 by suitable means, not shown, such as a flow of air.

Figure 20:
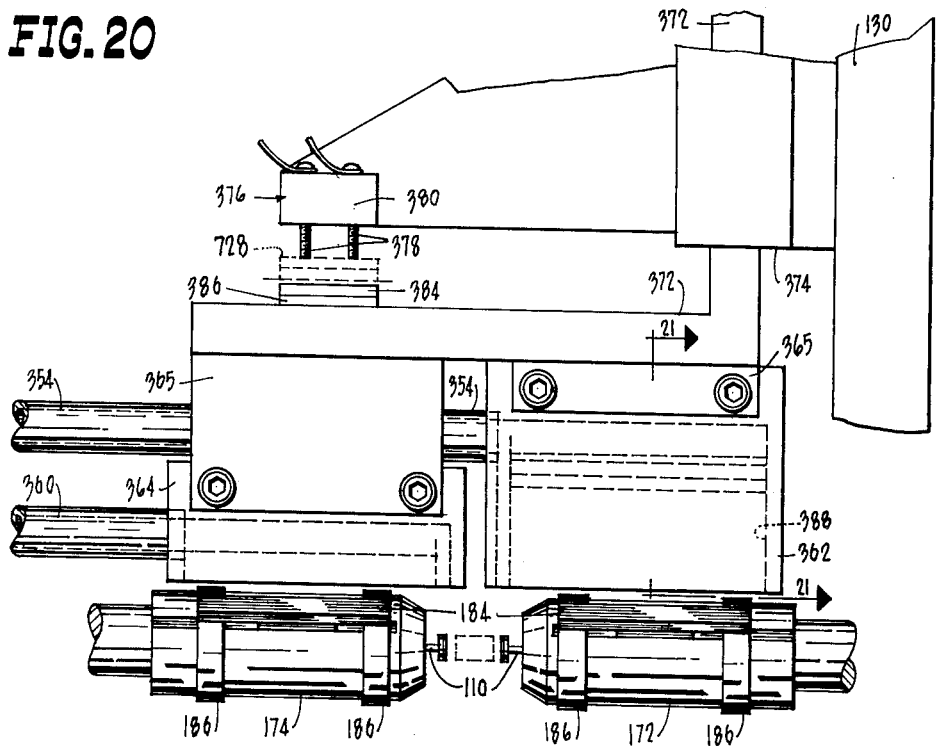
FIG. 20 is a side elevation of the lead guide assembly illustrating how the leads are fed and guided into the chucks.

Referring now to FIG. 20, it is seen that lead chutes 354 and 360 terminate at chuck lead guides 362 and 364 respectively. Chuck lead guides 362 and 364 are fixedly mounted to lead guide support 372 by means of brackets 365, which support slidably disposes said lead guides 362 and 364 over chucks 172 and 174 respectively. Referring additionally to FIGS. 5 and 6, it is seen that at a predetermined time, by means not shown and hereinafter described, such as a solenoid valve, air is introduced into air cylinder 366 through inlet 368 causing piston shaft 370 thereof to lower chuck lead guide support 372 to a position where chuck lead guides 362 and 364 are disposed over chucks 172 and 174 respectively. Chuck lead guides 362 and 364 are rigidly mounted to vertically slidable support 372. Support 372 is slidable within member 374 which is rigidly mounted to support plate 130. Lead guide interlock 376 is in turn fixedly mounted to member 374. Lead guide interlock 376 comprises electrical terminals 378 disposed within electrically insulating material member 380.

When support 372 is in its normal raised position, where it is maintained by spring 382, electrical contact is made by both terminals 378 with conductive material plate 384 completing an electrical circuit hereinafter described. Plate 384 is insulated from support 372 by means of electrically insulating material plate 386. Only when support 372 is in said raised position and said electrical circuit is completed through plate 384, can machine head 134 be indexed. It should be noted that said lead guide interlock may also be an electrical switch.

Figure 21:
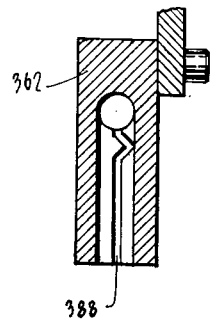
FIG. 21 is a cross-sectional view of the detail of the inner chuck guide taken along lines 21—21 of FIG. 20.

When a pair of empty chucks 172 and 174 are indexed to the loading station and locked in position, and lead clamps 184 are withdrawn as hereinbefore described, air cylinder 366 causes chuck lead guides 362 and 364 to lower to just above said chucks, and a pair of leads 110 are fed from vibratory feeder 328 through chutes 354 and 360 to chuck lead guides 362 and 364 from where they drop into said chucks with the heads thereof facing each other. Referring additionally to FIG. 21, it is seen that the inner chuck lead guide 362, into which the lead is fed head last, is formed with a zig-zag channel 388 to prevent the wire portion of lead 110 from dropping until the head thereof is in the guide. Thereby said lead is dropped substantially uniformly into chuck 172.

B. *Blank feeding and loading means*

Figure 22:
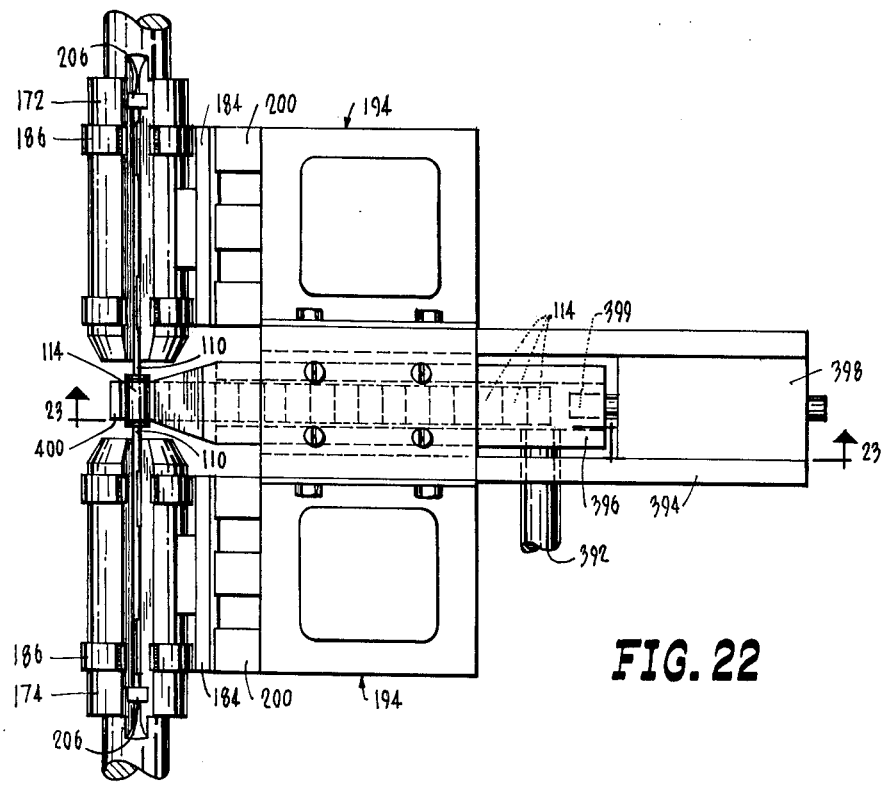
FIG. 22 is a plan view of a resistor blank feeder showing a blank in position to be gripped by leads held in the chucks.
Figure 23:
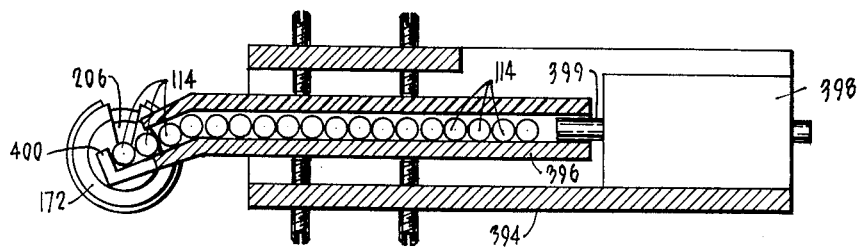
FIG. 23 is an elevation of the resistor blank feeder of FIG. 22 taken along lines 23—23 thereof.

A supply of resistor blanks 114 is fed from a suitable vibratory feeder, not shown, through chute 392 to blank feeding and loading means as illustrated in FIGS. 22 and 23. A suitable vibratory feeder may be readily selected by one familiar with the art. Said vibratory feeder is disposed over said feeding and loading means and the blanks are conveyed through chute 392 by gravity. Said blank feeding and loading means comprise a body 394 within which a channel member 396 is disposed. A solenoid 398 is positioned within body 394 so that its piston 399 is disposed at one end of channel member 396. Channel member 396 is connected to the end of chute 392 so that resistor blanks 114, being fed through said chute, emerges into said channel. At the other end of said channel, a lip 400 is formed. As resistor blanks 114 are fed to channel 396 they are caused to move within said channel by solenoid 398, which is energized by means hereinafter described, until said resistor blanks come to rest against lip 400. Channel 396 is positioned and fixedly mounted to body 394, and in turn to plate 130, so that the resistor blank adjacent lip 400 is coaxially disposed between leads 110 within chucks 172 and 174 at the component parts loading station.

As leads 110 are fed to chucks 172 and 174, and chuck 172 is released as hereinbefore described, said leads grip the resistor blank adjacent lip 400 completing the parts loading operation. As the chucks are indexed to the next station, solenoid 398 advances the resistor blanks within channel 396 until the next resistor blank in line is adjacent lip 400 and in position to be gripped by leads during the next loading cycle. When solenoid 398 is de-energized, another resistor blank enters channel 396 from chute 392.

V. CONDUCTIVE MATERIAL APPLICATION MEANS

Referring to FIGS. 5 and 7, it is seen that after the component parts are loaded the spindles are indexed to the next station which may be the preheating station when desired. The spindles with said component parts therein are then indexed to the conductive material application station. At this station electrical continuity is provided between the leads 110 and resistor blank 114 by means of applying a continuous band 124 of conductive material over the ends of blank 114 and lead discs 116 as illustrated in FIG. 3.

The conductive material may be in the form of powdered metal, metallic frit, metallic paint, or the like. Metals suitable for this purpose are silver, copper, aluminum, or the like. The conductive material may be applied by spraying, brushing, and other similar processes. The preferred method, however, is to spray silver powder by means of a plasma jet torch. A suitable device is described in copending U.S. patent application entitled "Plasma-Jet Torch," Serial No. 242,491, filed December 5, 1962 by R. M. Johnson.

Plasma jets are defined as streams of neutral gas, ions, and electrons at high temperatures. They are created by passing an ionizable gas much as nitrogen, argon, helium, neon, krypton, or the like gas through and about an electric arc. By introducing a conducting material, such as powdered silver, into a plasma stream directed at the junction of said discs and said resistor blank, the powder particles become molten and adhere to the surface upon which they impinge. By applying sufficient molten particles to said resistor components, a continuous band of conducting material is formed providing electrical continuity between resistor blank 114 and leads 110.

The powdered conducting material is supplied in gas suspension by powder feeding means such as, for example, described in copending U.S. patent application entitled "Method and Apparatus for Feeding Powder," Serial No. 223,350, filed September 13, 1962 by J. C. Manley now Patent No. 3,149,759. Such means provide uniform and comparatively small amounts of powdered silver in gas suspension to the plasma jet torch by measuring and providing powdered silver at a controlled rate by vibratory means and thereafter suspending the powdered silver in a gas which carries it along to the point of use.

Referring again to FIGS. 5 and 7 it is seen that as machine head 134 is indexed to the conductive material application station, resistor blank 114 is positioned immediately below shield 402. Shield 302 comprises a tubular water cooled member having a flattened portion 404 in the area of said application station. The width of flattened portion 404 is made to correspond to the central portion of blank 114 which is masked during application of said silver conductive bands. Therefore, when machine head 134 is indexed, resistor blank 114 is positioned below portion 404 exposing substantially equal end portions of said blank on either side of said flattened portion 404. Plasma jet torches 406 and 408 are rigidly mounted to plate 130, by adjustable support 409, so that the plasma streams therefrom are directed at the opposite ends of resistor blank 114 and the edge of the lead disc adjacent thereto. Since the resistor components are continuously rotated about their longitudinal axis, as hereinbefore described, a continuous band of silver is applied. Shield 402 prevents any silver from being applied to the central resistive portion of blank 114.

Water is supplied from a suitable source, not shown, and is circulated through shield 402 to maintain it cool. It has been found that molten metallic particles which are sprayed on said shield do not adhere thereto when it is maintained cool.

Powdered silver is supplied to each of the plasma torches 406 and 408 in gas suspension from a powder feeder, not shown, and as heretofore described. Said powder is fed to the plasma stream by means of tubes 412 that are disposed at opposite sides of the outlet of each torch orifice, that is at approximately 180° apart from one another, to introduce the silver equally from opposite sides of the plasma stream so that the stream is not deflected. Furthermore, the sliver powder is introduced in to the plasma stream where the temperature thereof is high and where it will have sufficient time to become molten before reaching the resistor components to which it is being applied. It should be noted that a plurality of powdered silver feeders may be used, if desired, as for example one for each said tube 412.

VI. ENCAPSULATION MEANS

Referring again to FIGS. 5 and 7, it is seen that after electrical continuity is provided between the resistor blank and the leads, the spindles are indexed to the next or encapsulating material application station. At this station a continuous coating 126 of impervious dielectric material, is applied to the resistor blank 114 and discs 116 extending thereover as illustrated in FIG. 4.

Suitable dielectric materials are glass, ceramics, inorganic synthetic resins, and the like. The preferred impervious dielectric material is glass.

The preferred method of applying a glass coating is by a plasma jet torch such as described hereinabove in connection with the application of silver electrical continuity bands. The powdered glass may be supplied in gas suspension to said plasma jet torch by powder feeder means such as described in connection with the application of said silver bands.

Referring again to FIGS. 5 and 7, it is seen that when machine head 134 is indexed to the encapsulating material application station, resistor blank 114 and leads 110 are in the path of the plasma stream from torch 414. Powdered glass is supplied to plasma torch 414 in gas suspension from a suitable powder feeder, not shown and as described above, by means of tubes 416 that are disposed at opposite sides of the outlet of the torch orifice for the same reasons as noted in connection with the description of torches 406 and 408. Torch 414 is caused to traverse along the length of the resistor blank by means hereinafter described. As resistor blank 114 is rotated or spun, molten particles of glass are caused to impinge on the surface of said blank and lead discs to form a continuous glass coating over the entire resistor surface. As coating 126, illustrated in FIG. 4, is applied, sufficient heat is transmitted through discs 116 to layers 120 of glass bonding material to fuse said layers to the resistor body, thereby forming a bond between discs 116 and the resistor blank. This simultaneous encapsulation and fusing of the parts together permit forming of the resistor in the shortest possible time and results in exposure thereof to high temperatures for the shortest period of time. It has been found that this simultaneous encapsulation and fusing result in the least resistance drift of the finished resistor.

A. *Traversing means*

Figure 25:
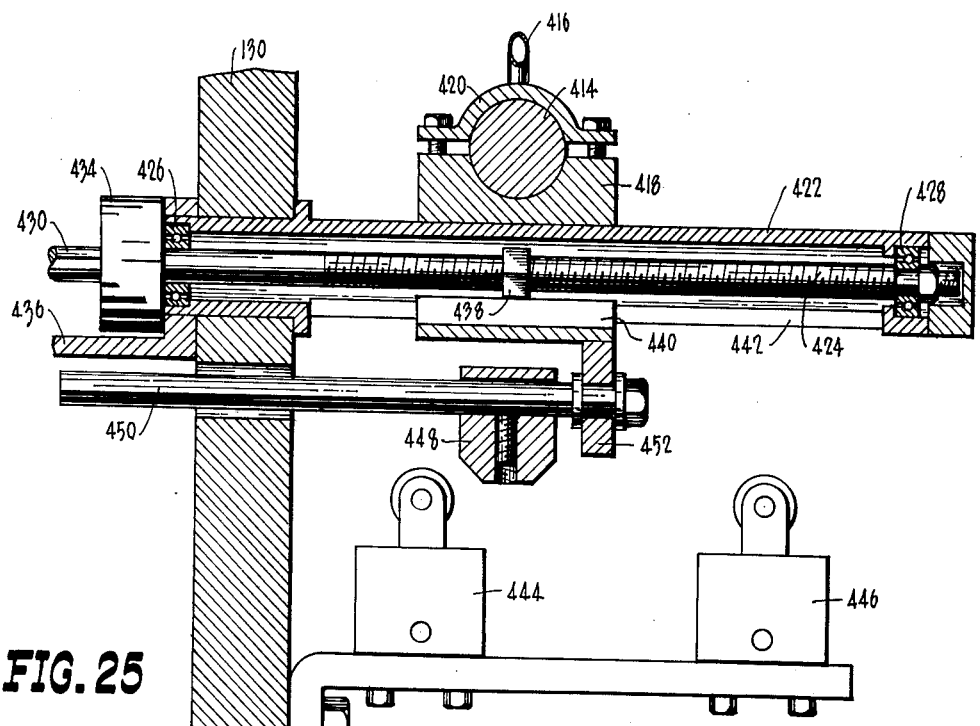
FIG. 25 is a cross-sectional view of the traversing mechanism of FIG. 24 taken along line 25—25 thereof.
Figure 24:
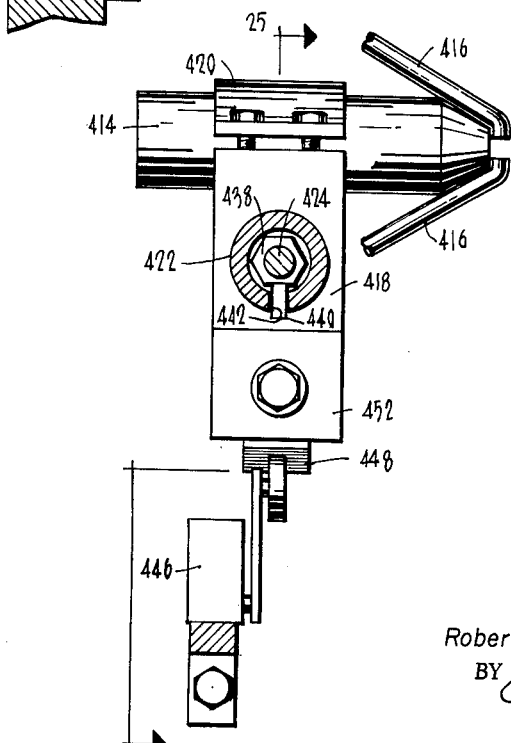
FIG. 24 is a cross-sectional view of the traversing mechanism for the encapsulating plasma torch.

Referring additionally to FIGS. 24 and 25, it is seen that plasma torch 414 is mounted on traversing support 418 and is fixed thereto by means of clamp 420. Support 418 is in sliding engagement with hollow shaft 422 within which threaded shaft 424 is carried by bearings 426 and 428. Threaded shaft 424 is fixedly connected to output shaft 430 of traversing motor 432 by means of coupling 434. Traversing motor 432 is fixedly mounted to plate 130 by means of support 436. Nut 438 is threaded onto the threaded portion of shaft 424, to which nut traversing support 418 is fixedly connected through key member 440. Key member 440 is disposed within slot 442 in hollow shaft 422 for slidable engagement with said shaft 422.

When traversing motor 432 is operating, as hereinafter described, threaded shaft 424 is caused to rotate. Since nut 438 is fixedly connected to key member 440, which key member is restrained from rotating by slot 442, nut 438 does not rotate, rather traverses along shaft 424 as said shaft is threaded into and out of said nut. Since traversing support 418 is fixedly connected to key member 440, it is caused to slide along hollow shaft 422 as nut 438 traverses shaft 424. Therefore, when motor 432 is operating, plasma torch 414, which is fixedly mounted to support 418, is caused to traverse forward and backward along shaft 422 depending on the direction of the rotation of motor 432.

The direction of rotation of traversing motor 432 is caused to reverse by selectively energizing electrical switches 444 and 446 by means of collar 448. Collar 448 is fixedly mounted to member 450 which in turn is fixedly mounted to traversing support 418 through member 452. As plasma torch 414 and support 418 is caused to move along shaft 422, collar 448 is caused to move a corresponding distance in the same direction. By suitably disposing switches 444 and 446 so that when collar 448 engages and actuates one of them, thereby electrically reversing motor 432 as hereinafter described, plasma torch 414 will be caused to traverse forward and backward through a desired distance. This distance may be suitably adjusted by moving switches 444 and 446 closer together or further apart as desired. The particular distance through which plasma torch 414 will be caused to traverse is determined by the position of switches 444 and 446 with respect to collar 448, as well as the position of collar 448 with respect to member 450.

VII. ANNEALING MEANS

After the resistor is coated with an adherent layer of glass, the coating glass must be annealed to obtain an unstrained and uncracked coating. Head 134 is again indexed to bring the freshly coated resistor into the first of three annealing stations. Since the length of annealing and the annealing conditions are determined by the type of glass used, the number of annealing stations and the glass temperature at each such station will have to be varied accordingly. One familiar with the glass art can readily determine the proper annealing cycle for the type of encapsulating glass used.

Referring to FIGS. 5 and 6 it is seen that adjacent each of the annealing stations heaters 454, 456, and 458 are provided and suitably mounted to plate 130. The heat output from each of these heaters is determined by the selected annealing cycle. The time that the coated resistor remains at each of the annealing stations is the same as for any other station, since the other operations described herein are taking place simultaneously at the other stations. A typical example of an annealing cycle for the preferred impervious dielectric material hereinbefore described is as follows: Temperatures of 400° C. at the first annealing station, 300° C. at the second, and 250° C. at the third station. The coating temperatures are maintained substantially uniform because the resistor with the coating thereon is continuously rotated during the entire annealing cycle.

VIII. TESTING MEANS

A. *Slip ring means*

As hereinbefore noted, the inner and outer chucks are insulated from each other and can be placed at a different electrical potential. As the resistor is held by the chucks, electrical continuity, and resistance thereof can be readily determined. The outer chucks 174 are common and grounded while the inner chucks 172 are connected through the slip ring means to suitable electrical circuitry.

Figure 15:
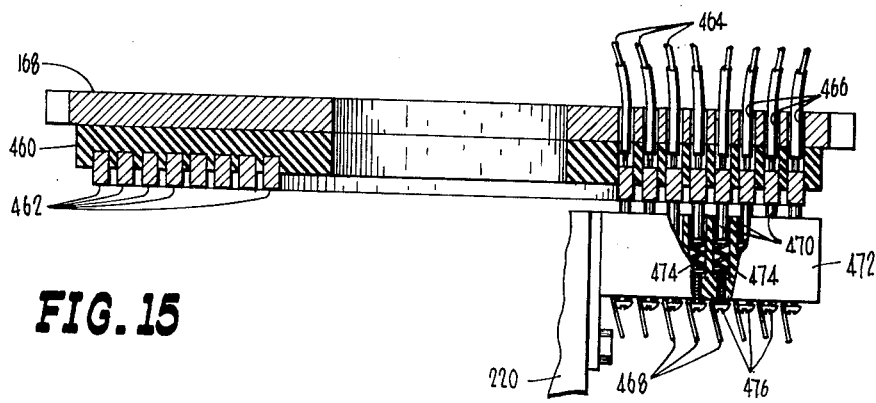
FIG. 15 is a plan view of the slip ring means and brush arrangement of this invention whereby electrical contact is made with the inner chucks.
Figure 16:
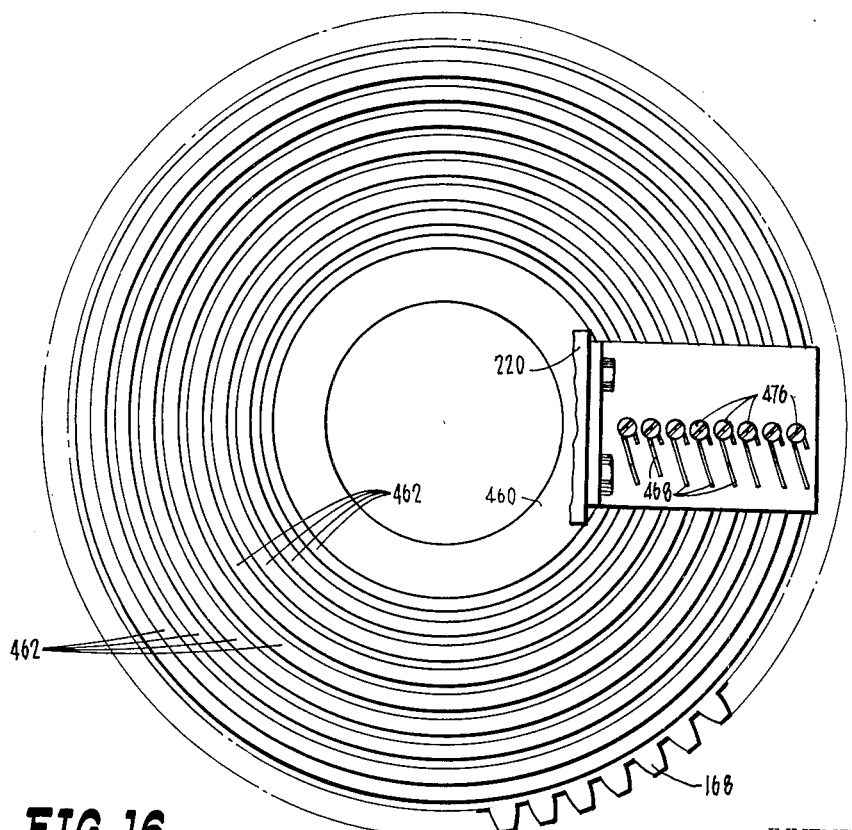
FIG. 16 is an elevation of the slip ring means shown in FIG. 15.

Referring to FIGS. 11, 15, and 16 it is seen that the slip ring means comprise a body 460 of electrical insulating material to which are mounted a series of concentric metallic rings 462 in a spaced parallel relationship with one another. Body 460 is fixedly mounted to gear 168. Leads 464 are passed through apertures 466 in gear 168 and are electrically connected to the back of slip rings 462, thereby each said lead and slip ring is insulated from each other lead and from ground. A suitable electrical source is connected to slip rings 462 through leads 468 and brushes 470 which brushes are disposed in housing 472 and make electrical contact with said slip rings by means of springs 474 and contact screws 476. Housing 472 is formed of suitable electrically insulating material and is rigidly mounted to support 220. Each of the inner chucks 172 are individually connected to a separate electrical source through one slip ring and brush as hereinafter described. The slip ring means are responsive to the indexing means and are caused to rotate as gear 168 rotates.

The electrical continuity and resistance of a particular resistor may be readily measured or sensed through said slip ring means at any station after the conductive material bands are applied at the conductive material application station. Such measurements are generally desired during the encapsulating and annealing steps when the electrical characteristics of the resistor may be affected.

IX. COMPONENT UNLOADING MEANS

Referring to FIGS. 5, 6, and 7 it is seen that after the glass coating is annealed the spindles are indexed to the resistor unloading station. The component unloading means are conveniently positioned about the spindles at the unloading station. After the spindles are indexed to the unloading station, the chuck rotation is stopped and they are locked in the unloading position and thereafter the inner chuck is retracted as hereinbefore described in connection with the spindle rotation means and component assembling means.

The chuck rotation is stopped in substantially the same manner as described in connection with the component assembling means. A pivot arm 478 engages shoulder 252 of pressure plate 246 when electro-magnet 480 is energized as hereinafter described. To provide unloading clearance, inner chuck 172 is retracted by energizing electro-magnet 482 causing retract pivot arm 484 to engage retract engagement plate 232 on shaft 230. The finished resistor is unclamped from the chucks by energizing electro-magnets 485 which withdraws clamps 184 from said chucks releasing said resistor.

After the chucks are stopped and inner chuck 172 is retracted, the resistor is unloaded. The unloading means comprise solenoid 486, to one end of shaft 488 of which a spring loaded resistor clamp is affixed. Said spring loaded resistor clamp comprises an upper jaw 490, fixedly attached to shaft 488, and pivotally mounted lower jaw 492. Spring 494 maintains lower jaw 492 in the normally closed position, that is adjacent to upper jaw 490. When solenoid 486 is de-energized, solenoid shaft 488 is retracted and said resistor clamp is open. The resistor clamp is opened in the retracted position by leg 496 of lower jaw 492 which causes said lower jaw to pivot when said leg comes in contact with the body of solenoid 486. When solenoid 486 is energized, by means hereinafter described, shaft 488 is caused to extend towards the resistor within the chucks. As leg 496 breaks contact with the body of said solenoid, the resistor clamp is caused to close by spring 494 until it reaches said resistor. The resistor clamp is opened to grip the finished resistor when beveled surfaces 498 of jaws 490 and 492 contact the resistor body and cause said jaws to spread apart until the resistor enters cavity 500 of said resistor clamp. The resistor clamp is illustrated by dotted lines 502 in the extended position gripping the resistor to be unloaded from the chucks.

When solenoid 486 is de-energized, after gripping the resistor to be removed, shaft 488 and the resistor clamp are retracted. When leg 496 contacts the solenoid body, lower jaw 492 is pivoted to open said clamp thereby releasing the resistor from cavity 500. The resistor then drops into a suitable collecting bin. The inner chuck 172 is then released from its retracted position by de-energizing magnet 482 and the spindles are thereafter rotated by releasing electro-magnet 480. The empty chucks are then indexed to the component parts, loading station to begin a new cycle.

X. OPTIONAL MEANS

A. *Marking means*

While the encapsulated resistor is being annealed suitable means may be disposed about the annealing station to mark and color code the resistors. Such means may comprise rollers, pads, brushes, and the like. If it is desired, a surface finish, such as enamel or the like may also be applied at the annealing stations.

B. *Other testing means*

During the encapsulation and annealing, the resistors are tested for electrical continuity and resistance. However, any other electrical characteristics such as overload, noise, temperature coefficient and the like may also be tested. As the resistors are indexed through the annealing stations, such other electrical characteristics may be measured by means of suitable electrical circuitry through the slip ring means. One familiar with the art may readily provide electrical circuitry and switching means to measure any desired characteristics.

C. *Component sorting means*

The component unloading means may be combined with component sorting means permitting selective placement of unloaded resistors in one of a plurality of bins, according to the values, and tolerances thereof, or into groups according to any measured electrical characteristic, or simply to reject defective resistors. Such sorting could be accomplished by suitable means readily selected by one familiar with the art.

XI. ELECTRICAL CIRCUITRY

A. *In general*

Figure 26:
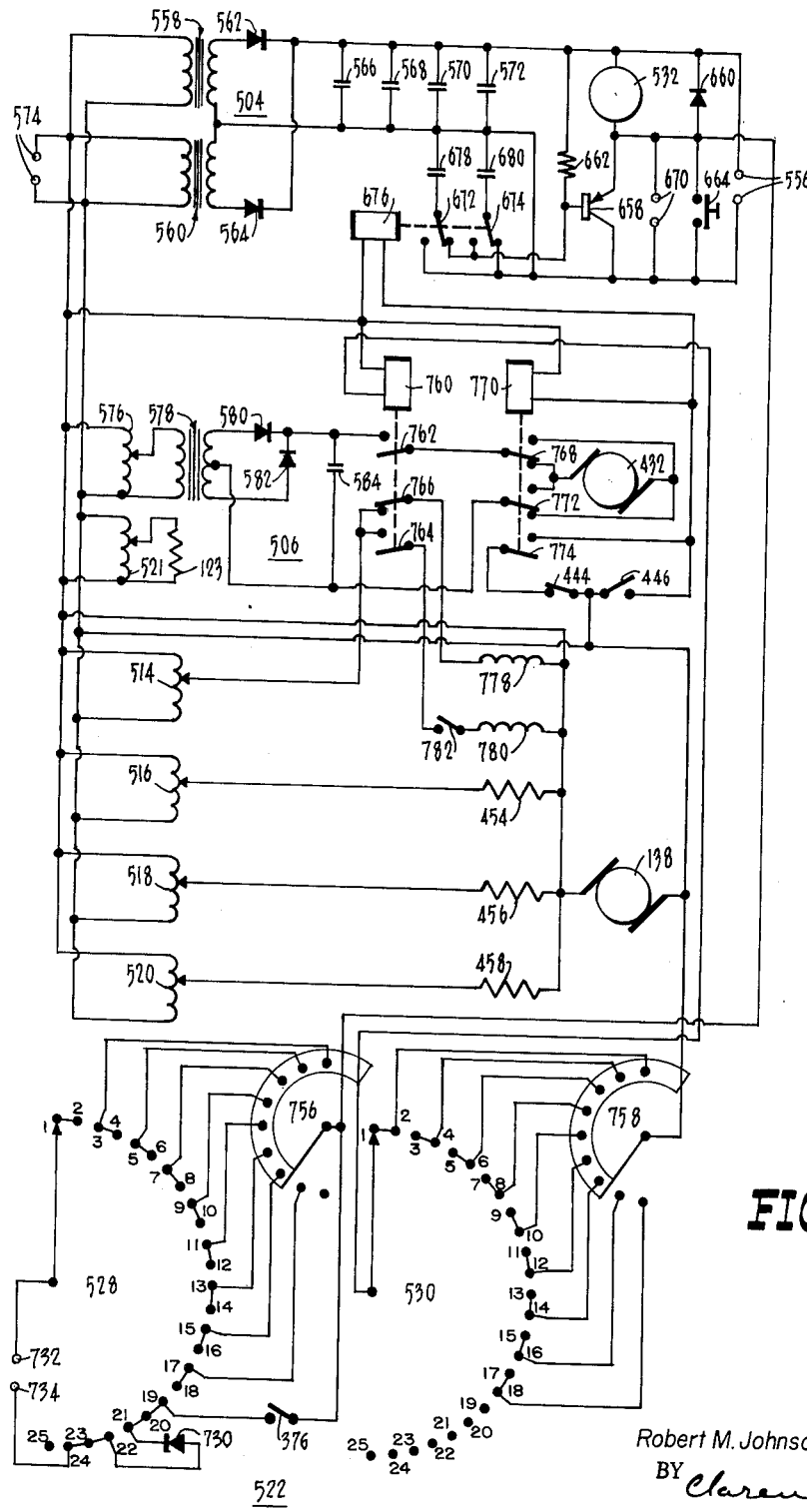
FIG. 26 is a schematic diagram illustrating the power supplies, portion of the operation control circuitry, and the traversing means circuitry of this invention.
Figure 28:
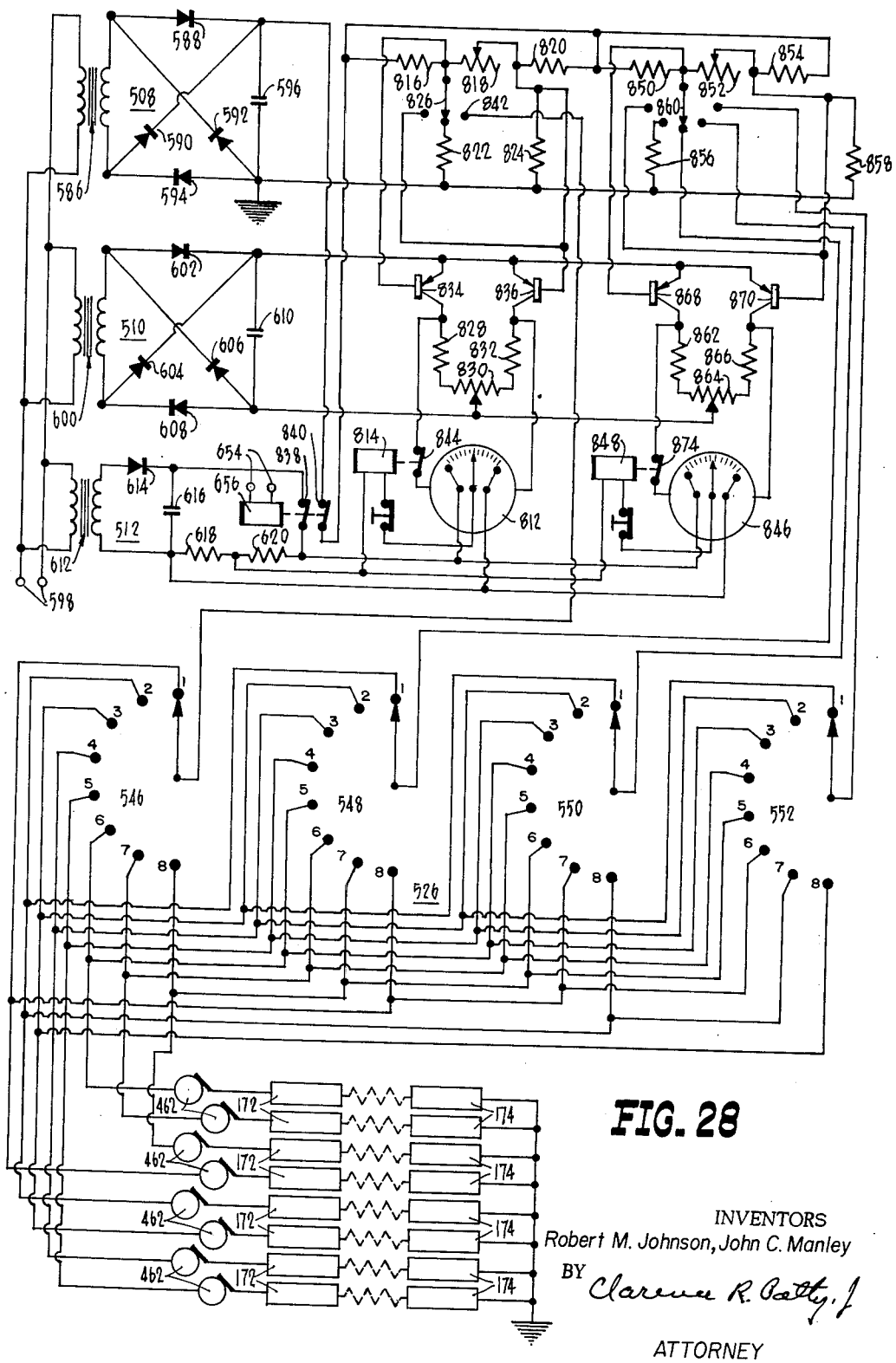
FIG. 28 is a schematic diagram of the resistance and electrical continuity testing circuitry of this invention.

The electrical circuitry may be divided into three categories such as the power supply circuitry, control or operating circuitry, and the testing circuitry. Power supplies 504 and 506 are illustrated in FIG. 26 and provide power to the various operating and control circuits and to the traversing motor circuit respectively. Power supplies 508, 510 and 512 are illustrated in FIG. 28 and provide power to various portions of the testing circuitry. In addition, variable transformers 514, 516, 518, 520 and 521 are illustrated in FIG. 26 and provide power to various components hereinafter described.

Figure 27:
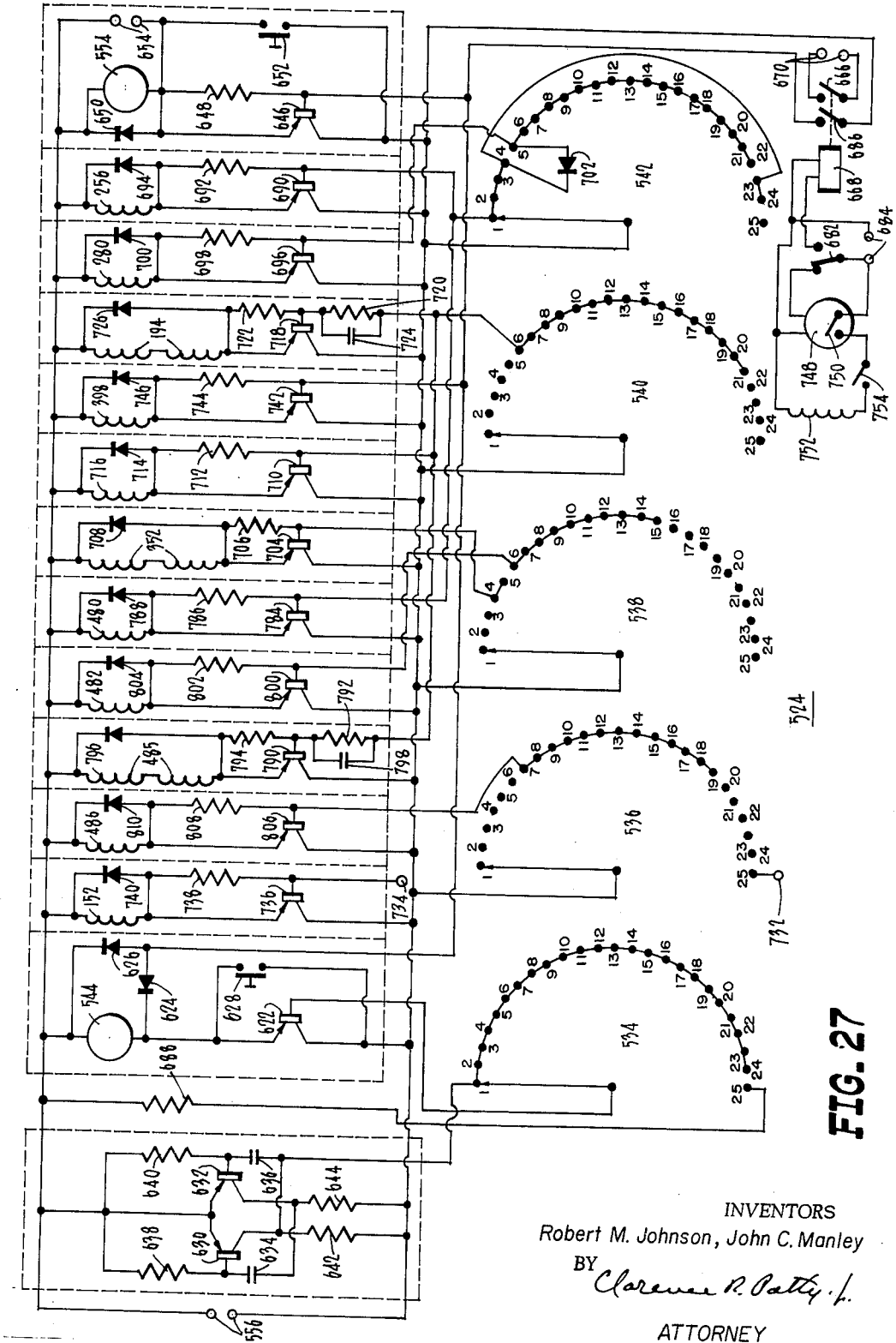
FIG. 27 is a schematic diagram of a portion of the operation control circuitry of this invention.

The programing or controlling functions of the various circuits are regulated by three stepping relays generally indicated by the numerals 522, 524, and 526. Stepping relay 522, comprising twenty five position relay banks 528 and 530, controls the operation of traversing motor 432 and is driven by stepping relay motor 532, as illustrated in FIG. 26. Stepping relay 524, comprising twenty five position relay banks 534, 536, 538, 540, and 542, programs the operating functions of the instant invention and is driven by stepping relay motor 544, as illustrated in FIG. 27. Stepping relay 526, comprising eight position relay banks 546, 548, 550, and 552, controls the test circuit operation, as illustrated in FIG. 28, and is driven by stepping relay motor 554, as illustrated in FIG. 27.

Referring to FIG. 26, power supply 504 supplied suitable electrical energy, such as 20 volts D.C., across terminals 556 to various control circuits. Power supply 504 comprises transformers 558 and 560, diodes 562 and 564, and filter capacitors 566, 568, 570, and 572. The primary windings of transformers 558 and 560 are connected in parallel to a suitable A.C. electrical source through terminals 574. The secondary windings of transformers 558 and 560 are connected in series through dodes 562 and 564 to provide full wave signal rectification. This rectified signal is provided across terminals 556, which terminals are common with the output from said diodes 562 and 564 and a point intermediate the secondary winding of transformers 558 and 560.

Power supply 506 provides suitable electrical energy, such as 12 volts D.C., to the circuit of traversing motor 432. Power supply 506 comprises variable transformer 576, transformer 578 having a center-tapped secondary winding, diodes 580 and 582, and A.C. bypass capacitor 584. Variable transformer 576 is connected across terminals 574. The primary of transformer 578 is connected across the output from variable transformer 576. Diodes 580 and 582 are connected to the secondary winding of transformer 578 to provide full wave signal rectification between the output from said diodes and the center-tap of said secondary winding of transformer 578.

Power supply 508 provides a suitable source of electrical energy, such as 30 volts D.C., across inner chuck 172 and outer chuck 174 and in turn across the resistors being formed when they are at predetermined desired stations. Power supply 508 comprises transformer 586, full wave rectifier bridge comprising diodes 588, 590, 592, and 594, and A.C. bypass capacitor 596. The primary winding of transformer 586 is connected to a suitable A.C. power source through terminals 598. One terminal from said full wave rectifier bridge is connected through suitable circuitry, hereinafter described, and through slip rings 462 to inner chucks 172, while the other terminal therefrom is connected through ground to outer chucks 174.

Power supply 510 provides a suitable source of electrical energy, such as 12 volts D.C., to a portion of the testing circuitry, as hereinafter described, and comprises transformer 600, a full wave rectifier bridge comprising diodes 602, 604, 606, and 608, and A.C. bypass capacitor 610. Power supply 512 results in half wave rectification and provides a source of electrical energy to another portion of the testing circuit, as hereinafter described. Power supply 512 comprises transformer 612, diode 614, A.C. bypass capacitor 616, and a voltage divider comprising resistors 618 and 620. The primary windings of transformers 600 and 612 are also connected to terminals 598.

The five bank, twenty five position stepping relay 524, which programs the operations at the various operating stations, is driven by stepping relay motor 544, which motor is embodied within a stepping relay motor circuit comprising transistor 622, diodes 624 and 626, and switch 628. Said stepping relay motor circuit is connected across terminals 556 and is supplied electrical energy by power supply 504. The base electrode of transistor 622 is biased by electrical signals from an oscillator circuit comprising transistors 630 and 632, capacitors 634 and 636, and resistors 638, 640, 642, and 644, through contacts 1–24 of bank 534 of stepping relay 524. The wiper arms of the several banks of stepping relay 524 are caused to advance one position for each oscillation of said oscillator circuit, therefore, if said oscillator circuit oscillates at, for example, 8 cycles per second, said wiper arms will be caused to traverse from position 1 to position 25 in about 4 seconds.

The four bank, eight position stepping relay 526 connects the resistors being fabricated, when they are at the encapsulating material application station and the three encapsulating material annealing stations, with the testing circuitry, whereby the electrical continuity of said resistors as well as their resistance is sensed and indicated while at said stations. Since the electrical continuity and resistance of said resistors is continuously sensed and indicated, while said resistors are at said stations, the wiper arms of the several banks of stepping relay 526 are caused to advance only 1 position for each indexing of head 134. Stepping relay 526 is driven by stepping relay motor 554 which is embodied within a stepping motor relay circuit comprising transistor 646, resistor 648, diode 650, and switch 652. Said circuit also embodies terminals 654, through which relay 656, as shown in FIG. 28, is energized for purposes hereinafter described. Said stepping motor relay circuit is supplied electrical energy from power supply 504 through terminals 556.

The two bank, twenty five position stepping relay 522 controls the traversing motor circuit, as hereinafter described, and is driven by stepping relay motor 532. Stepping relay motor 532 is embodied within a stepping motor relay circuit comprising transistor 658, diode 660, resistor 662, switch 664, relay contacts 666 of relay 668, as shown in FIG. 27, and terminals 670. Said circuit also embodies relay contacts 672 and 674 of relay 676, and capacitors 678 and 680. As traversing motor 432 is caused to operate, thereby alternately energizing and de-energizing traversing switches 444 and 446 as hereinafter described, relay 676 is correspondingly caused to be energized and de-energized alternately. Accordingly, capacitors 678, and 680 are alternately connected to the base electrode of transistor 658 through one pole of each of relay contacts 672 and 674 respectively. Transistor 658 is caused to conduct when either of capacitors 678 or 680 is connected to the base electrode thereof, and while the capacitor so connected is being charged, thereby causing relay motor 532 to advance the wiper arms of stepping relay 522 one position. When disconnected from the base electrode of transistor 658, capacitors 678 and 680 are shorted out and discharged through the other poles of their respective relay contacts 672 and 674. Said stepping motor relay circuit of motor 632 is also connected across terminals 556 of power supply 504.

B. *Control circuitry*

For the purposes of simplicity, clarity, and brevity the control circuitry will be described in connection with the various operations and functions performed at the several stations, commencing with the component parts loading station around to the component unloading station. Starting with the wiper arms of stepping relays 522 and 524 in position 25, machine head 134 together with inner chucks 172 and outer chucks 174 is being indexed.

Referring now to FIG. 27, near the end of the indexing cycle switch 682 is mechanically engaged by pivot arm 156 causing it to energize relay 668 from a suitable electrical source through terminals 684. As relay 668 is energized, contacts 666 thereof are caused to close thereby energizing stepping relay motor 532 through terminals 670 and causing the wiper arms of stepping relay 522 to be advanced from position 25 to position 1 as shown in FIG. 26. Simultaneously therewith, contacts 686 of relay 668 are also closed thereby energizing stepping relay motor 544 through diodes 624 and 626, whereby the wiper arms of stepping relay 524 are caused to advance from position 25 to position 1. In positions 1 through 24 of bank 534 of stepping relay 524, the heretofore described oscillator circuit embodying transistors 630 and 632 provides a signal to stepping relay motor 544 causing the wiper arms of stepping relay 524 to be stepped to position 25, in which position stepping relay 524 will be stopped and the signal from said oscillator will be bypassed through resistor 688.

One pair of inner chucks 172 and outer chucks 174 are stopped in the component parts loading station by means of a load chuck stopping circuit comprising transistor 690, resistor 692, diode 694, and electro-magnet 256. In positions 1 through 24 of bank 542 of stepping relay 524, transistor 690 is caused to conduct thereby energizing electro-magnet 256. When electro-magnet 256 is energized, the rotation of the inner chuck 172 and the outer chuck 174 in the component parts loading station is stopped as heretofore described.

In the component parts loading station inner chuck 172 is caused to be retracted, as heretofore described, by the load chuck retract circuit comprising transistor 696, resistor 698, diode 700, and retract electro-magnet 280. Transistor 696 is caused to conduct, thereby energizing retract electro-magnet 280 in positions 5 through 22 of bank 542 of stepping relay 524. Positions 5 through 22 of bank 542 are electrically isolated from positions 1 through 4, 23, and 24 by means of diode 702.

A pair of leads 110 are released from vibratory parts feeder 328, as heretofore described, in positions 4 and 5 of bank 538 of stepping relay 524, by lead release circuit comprising transistor 704, resistor 706, diode 708, and electro-magnets 352. The leads so released, are then conveyed by means of chutes 354 and 360 to inner and outer lead guides 362 and 364 respectively.

As leads 110 are being conveyed to lead guides 362 and 364, said lead guides are caused to be lowered, by a lead guide circuit, to a position immediately above the stopped inner and outer chucks 172 and 174 respectively, in positions 6 through 21 of bank 540 of stepping relay 524, so that said leads may drop into said chucks when they arrive. Said lead guide circuit comprises transistor 710, resistor 712, diode 714, and solenoid valve 716. As solenoid valve 716 is energized, air is supplied to air cylinder 366 which causes said lead guide to be lowered as heretofore described.

Simultaneously with the lowering of said lead guides, lead clamps 184 are caused to be partly withdrawn from inner and outer chucks 172 and 174 respectively, to permit said leads to be suitably disposed within said chucks, by means of a load chuck opening circuit comprising transistor 718, resistors 720 and 722, capacitor 724, diode 726, and electro-magnets 194. Said load chuck opening circuit is also energized in positions 6 through 21 of bank 540 of stepping relay 524.

As heretofore described, in the component parts loading station the rotation of the inner and outer chuck is stopped, the inner chuck is retracted, the leads are released from the vibratory parts feeder, simultaneously therewith the lead clamps are withdrawn from said chucks and the lead guides are lowered to permit said leads to drop into said chuck, the lead guides are then raised, the lead clamps are released firmly gripping said leads, the inner chuck is released to permit a resistor blank to be gripped between said leads, and the chucks are caused to rotate once more. At this point the wiper arms of stepping relay 524 are stopped in position 25.

Referring additionally to FIGS. 20 and 26 it is seen that when lead guides 362 and 364 are in their normal raised position, lead guide interlock 376 is closed as indicated by dotted lines 728, so that an electrical circuit is completed through it. When, as shown, lead guides 362 and 364 are lowered to a position immediately above chucks 172 and 174, to dispose leads in said chucks are heretofore described, lead guide interlock 376 is open so that an electrical circuit is not completed through it. When the wiper arm of bank 528 of stepping relay 522 reaches position 19, stepping relay 522 is stopped if lead guide interlock 376 is open. Such a situation would occur only when stepping relay 522 is caused to step ahead of stepping relay 524, and lead guides 362 and 364 are in a lowered position. In such a lowered position said lead guides might interfere with the indexing of head 134 which will begin when the wiper arm of bank 528 reaches position 22 thereof. If, as hereinabove noted, the wiper arms of stepping relay 524 are in position 25, lead guide interlock 376 will be closed and the wiper arm of bank 528 of stepping relay 522 will continue to be stepped to position 22, in which position the indexing circuit is energized. Stepping relay 522 will continue to be stepped by means of diode 730 until the wiper arm reaches position 25, through which diode, together with lead guide interlock 376, the circuit of stepping relay motor 532 is completed. When the wiper arms of stepping relay 522 reach position 25 they are stopped, while head 134 is being indexed. The wiper arms of stepping relays 522 and 524 are then stepped from position 25 to position 1, as heretofore described.

When the wiper arm of bank 536 of stepping relay 524 is in position 25 and the wiper arm of bank 528 of stepping relay 522 reaches position 22 thereof, the indexing circuit is energized through terminals 732 and 734. The indexing circuit comprises transistor 736, resistor 738, diode 740 and indexing solenoid 152. When indexing solenoid 152 is energized, single revolution clutch 144 is engaged and head 134 is indexed as heretofore described.

As head 134 is indexed, a resistor blank 114 is lifted out of channel member 396 between the pair of leads in chucks 172 and 174. When switch 682 is mechanically engaged by pivot arm 156 near the end of the indexing cycle, relay 668 is energized and its contacts 666 and 686 are caused to close. When contacts 686 are closed a resistor blank advance circuit is energized causing solenoid 398 to be energized, whereby resistor blanks 114 are advanced in channel member 396 by piston 399 until a blank comes to rest against lip 400 in position to be gripped by the succeeding pair of leads loaded in the chucks. The resistor blank advance circuit comprises transistor 742, resistor 744, diode 746 and solenoid 398, and is connected across terminals 556. Simultaneously with the energizing of the resistor blank advance circuit, the circuit of stepping relay motor 554 is also energized by contacts 686 of relay 668, causing stepping relay 526 to advance one position.

At the end of the indexing cycle the component parts loaded at the previous station are now at the preheating station. As heretofore described, when the component being fabricated or the materials thereof require preheating, such preheating is performed by heater 123. Heater 123 is connected to variable transformer 521 and in turn to a suitable source of electrical energy through terminals 574. The component parts remain at this second station while other operations are being performed at the other stations. Head 134 is then indexed as hereinabove described and said component parts are advanced to the conductive material application station.

When switch 682 is released after being mechanically engaged by pivot arm 156 near the end of the indexing cycle, timer 748 is energized and contacts 750 thereof are closed. When electrical continuity between the component leads and the resistor blank is desired to be obtained by applying a band of conductive material such as silver, by means of a plasma torch or other application means, timer 748 causes the conductive material to be fed to said torch by energizing a vibratory feeder 752, for example. To permit the conductive material to be fed to its application means only when there is a component in chucks 172 and 174 and in proper position in relation to the application means, switch 754 is provided. Switch 754 is mechanically actuated when a resistor is in proper position to have the conductive material applied thereto. Timer 748 regulates the amount of conductive material applied by opening contacts 750 at the end of a preset desired period of time, thereby de-energizing vibratory feeder 752. Head 134 is then indexed and said component parts are advanced to the encapsulating material application station.

At the encapsulating material application station dielectric material such as glass is applied, in molten particle form, to said component parts by means of a plasma jet torch which is caused to traverse forward and backward along the resistor body, as heretofore described. Referring to FIG. 26, a sectionalized rotary switch comprising banks 756 and 758 is employed to control the number of times said plasma jet torch will traverse said resistor and consequently the amount of encapsulating material applied thereto.

When the wiper arm of bank 530 of stepping relay 522 reaches position 1, relay 760 is energized causing contacts 762 and 764 thereof to close and contacts 766 to open. Upon closing of contacts 762, traversing motor 432 is energized through contacts 768 of relay 770. As heretofore described, traversing motor 432 causes switches 444 and 446 to be mechanically actuated alternately. Contacts 772 and 774 of relay 770 are also in the traversing motor circuit. Contacts 772 in conjunction with contacts 768, are in the circuit of said motor, while contacts 774 alternately energize and de-energize relay 770. As the wiper arm of blank 530 reaches position 1 thereof, relay 760 is energized and the circuit of traversing motor 432 is completed through contacts 762 and one pole of each of double pole contacts 768 and 772. When traversing motor 432 actuates normally open switch 446 thereby closing it, relay 770 is energized closing contacts 774 and switching to the other poles of contacts 768 and 772 thereof. The direction of rotation of traversing motor 432 is then reversed and its circuit is completed through said other poles of contacts 768 and 772. As said direction of rotation is reversed, switch 446 returns to its normally open position. Although said direction of rotation is reversed and switch 446 is opened, relay 770 remains enerized since its circuit is completed through contacts 774.

When traversing motor 432 causes normally closed switch 444 to become actuated thereby opening it, relay 770 is de-energized causing contacts 768 and 772 to return to their original position. In this position of contacts 768 and 772, the direction of rotation of said traversing motor is again reversed. This motor traversing continues until the wiper arm of bank 530 is advanced to a position beyond the setting of wafer switch bank 758 thereby disrupting electrical continuity through bank 758 and consequently de-energizing relay 760. When contacts 762 of relay 760 are opened, traversing motor 432 is stopped.

To provide uniform encapsulation of the component and to prevent localized overheating thereof, the plasma stream from encapsulating plasma torch 414 is directed to the component only while traversing motor 432 is traversing the component body. Accordingly, the plasma stream is deflected by means of a jet of pressurized gas directed across the orifice of said plasma torch by nozzle 776, as illustrated in FIGS. 5 and 7. This pressurized gas is controlled by solenoid valve 778. The operation of solenoid valve 778 is controlled by contacts 766 of relay 760. Accordingly, when traversing motor 432 is operating and relay 760 is energized, normally closed contacts 766 are open de-energizing normally closed solenoid valve 778 thereby permitting said plasma stream to be directed to the component. When said traversing motor is stopped and relay 760 is de-energized, contacts 766 close energizing solenoid valve 778 causing said plasma stream to be deflected.

In addition, the encapsulating material is also fed to plasma torch 414 only when traversing motor 432 and relay 760 is energized. When relay 760 is energized, contacts 764 thereof are closed completing a circuit for vibratory powder feeder 780, which feeds encapsulating material to plasma torch 414. An additional switch 782 is provided to cut off vibratory feeder 780 if a component is not properly disposed in chucks 172 and 174. Switch 782 is mechanically actuated when the component is in position to be encapsulated.

After the component is encapsulated, head 134 is indexed and said component is advanced to the encapsulating material annealing stations. The encapsulating material is annealed at the three stations following the encapsulating station. The component temperature is controlled at these stations by heaters 454, 456, and 458 respectively. The electrical power to these heaters is controlled by variable transformers 516, 518, and 520 respectively. The temperature at these stations is varied as required for the particular encapsulating material employed. Head 134 is, of course, indexed as heretofore described to advance the component to each of these stations.

After annealing head 134 is indexed again and the component is advanced to the component unloading station. Inner chuck 172 and outer chuck 174 are stopped in the component unloading station by means of an unload chuck stopping circuit comprising transistor 784, resistor 786, diode 788, and electromagnet 480. In positions 1 through 24 of bank 542 of stepping relay 524, transistor 784 is caused to conduct thereby energizing electro-magnet 480. When electro-magnet 480 is energized, the rotation of chucks 172 and 174 in the component unloading station is stopped as heretofore described in connection with electro-magnet 256 in the component parts loading station.

When chucks 172 and 174 are stopped, lead clamps 184 are caused to be partly withdrawn therefrom to permit the completed component to be removed. The withdrawal of lead clamps 184 is controlled by unload chuck opening circuit comprising transistor 790, resistors 792, and 794, diode 796, capacitor 798, and electro-magnets 485. Said unload chuck opening circuit is energized in positions 6 through 21 of bank 540 of stepping relay 524.

In the component unloading station, inner chuck 172 is caused to be retracted, as heretofore described, by the unload chuck retract circuit comprising transistor 800, resistor 802, diode 804, and retract electro-magnet 482. Transistor 800 is caused to conduct, thereby energizing retract electro-magnet 482, in positions 6 through 15 of bank 538 of stepping relay 524. Inner chuck 172 is retracted in the component unloading station to provide room for the unloading means to remove the component from the chucks.

After the chuck rotation is stopped and the inner chuck is retracted, a spring loaded resistor clamp affixed to the end of shaft 488 of solenoid 486 is caused to grasp the component, as heretofore described, when solenoid 486 is energized. The component unloading circuit comprises transistor 806, resistor 808, diode 810, and unload solenoid 486. Transistor 806 is caused to conduct, thereby energizing unload solenoid 486 in positions 7 through 19 of bank 536 of stepping relay 524. After the component is unloaded, head 134 is indexed and the described pair of inner and outer chucks is advanced to the component parts loading station to begin another cycle.

It is understood that there is a pair of inner and outer chucks at each one of the stations described, and that all of the operations described are conducted at the same time at the respective stations.

For simplicity and ease of understanding the sequences of the various operations are shown in the following table:

| | Controlling Bank | Energized Condition—Steeping Relay Bank Positions | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Traversing Motor | 530 | x | x | x | x | x | x | x | x | x | x | x | x | |
| Indexing Circuit | 528 | | | | | | | | | | | | | |
| Load Chuck Stopping Circuit | 542 | x | x | x | x | x | x | x | x | x | x | x | x | |
| Load Chuck Retract Circuit | 542 | | | | | x | x | x | x | x | x | x | x | x |
| Load Release Circuit | 538 | | | | x | x | | | | | | | | |
| Lead Guide Circuit | 540 | | | | | | | x | x | x | x | x | x | x |
| Load Chuck Opening Circuit | 540 | | | | | | x | x | x | x | x | x | x | x |
| Blank Advance Circuit | | | | | | | | | | | | | | |
| Unload Chuck Stopping Circuit | 542 | x | x | x | x | x | x | x | x | x | x | x | x | |
| Unload Chuck Opening Circuit | 540 | | | | | | x | x | x | x | x | x | x | x |
| Unload Chuck Retract Circuit | 538 | | | | | | x | x | x | x | x | x | x | x |
| Component Unloading Circuit | 536 | | | | | | | x | x | x | x | x | x | x |
| Relay Motor 532 Circuit | 528 | x | x | x | x | x | x | x | x | x | x | x | x | x |
| Relay Motor 544 Circuit | 534 | x | x | x | x | x | x | x | x | x | x | x | x | x |

| | Controlling Bank | Energized Condition—Stepping Relay Bank Positions | | | | | | | | | | | | |
|---|---|---|---|---|---|---|---|---|---|---|---|---|---|---|
| | | 14 | 15 | 16 | 17 | 18 | 19 | 20 | 21 | 22 | 23 | 24 | 25 | Between Positions 25 and 1 |
| Traversing Motor | 530 | x | x | x | x | | | | | | | | | |
| Indexing Circuit | 528 | | | | | | | | | | x | x | | |
| Load Chuck Stopping Circuit | 542 | x | x | x | x | x | x | x | x | x | x | x | | |
| Load Chuck Retract Circuit | 542 | x | x | x | x | x | x | x | x | x | | | | |
| Load Release Circuit | 538 | | | | | | | | | | | | | |
| Lead Guide Circuit | 540 | x | x | x | x | x | x | x | x | | | | | |
| Load Chuck Opening Circuit | 540 | x | x | x | x | x | x | x | x | | | | | |
| Blank Advance Circuit | | | | | | | | | | | | | | x |
| Unload Chuck Stopping Circuit | 542 | x | x | x | x | x | x | x | x | x | x | x | | |
| Unload Chuck Opening Circuit | 540 | x | x | x | x | x | x | x | x | | | | | |
| Unload Chuck Retract Circuit | 528 | x | x | | | | | | | | | | | |
| Component Unloading Circuit | 536 | x | x | x | x | x | | | | | | | | |
| Relay Motor 532 Circuit | 528 | x | x | x | x | x | x | x | x | x | x | | | |
| Relay Motor 544 Circuit | 534 | x | x | x | x | x | x | x | x | x | x | | | | x Denotes energized condition.

C. Testing circuitry

Referring to FIG. 28, while the resistor is at the encapsulating material application station and the three encapsulating material annealing stations, the electrical continuity and the resistance thereof is sensed and indicated. It is readily seen that other characteristics and parameters thereof may also be sensed and indicated and that these may be sensed and indicated at any station desired.

As heretofore described, stepping relay 526 connects the resistors being fabricated at the hereinabove noted four stations with the testing circuitry. The wiper arms of stepping relay 526 are advanced one position each time head 134 is indexed and are also thus advanced from position 8 to position 1.

The testing circuit which senses and indicates electrical continuity at the encapsulating material application station comprises meter relay 812, relay 814, resistors 816, 818, 820, 822, and 824, switch 826 and a bridge comprising resistors 828, 830, and 832 and transistors 834 and 836.

Meter relay 812 is preset by variable resistor 830 and calibration resistor 822 to indicate deviation from the predetermined value of said test resistor. When stepping relay 526 is being stepped, relay 656 is energized and normally closed contacts 838 and 840 thereof are opened thereby isolating the test circuit. When the resistor in the encapsulating material application station is being tested, switch 826 is switched to contact 842. If the test resistor does not have electrical continuity or its resistance deviation exceeds preset limits, meter relay 812 is de-energized when the indicated contacts thereof energize relay 814 which in turn opens normally closed contacts 844. It is readily seen that such a testing circuit may be easily adapted to embody suitable means for sorting resistors.

The testing circuit which senses and indicates electrical continuity at the three annealing stations is substantially identical with the circuit hereinabove described and comprises meter relay 846, relay 848, resistors 850, 852, 854, 856, and 858, switch 860, and a bridge comprising resistors 862, 864, and 866 and transistors 868 and 870.

Meter relay 846 is preset by variable resistor 864 and calibration resistor 856 to indicate deviation from the predetermined value of said test resistor. Switch 860 has three test contacts 872 to which it may be switched to sense the resistance deviation at the particular annealing station desired. As will be readily seen by one familiar with the art, this switching and indicating arrangement may readily be changed to sense and indicate the resistance of the test resistors at all three annealing stations at the same time without the need for switching. If the test resistor does not have electrical circuitry or its resistance deviation exceeds preset limits, meter relay 846 is de-energized when the indicating contacts thereof energize relay 848 which in turn opens normally closed contacts 874. It is also readily seen that such a testing circuit may be easily adapted to embody suitable means for sorting resistors.

Although the present invention has been described with respect to specific details of certain embodiments thereof, it is not intended that such details be limitations upon the scope of the invention except insofar as set forth in the following claims.

We claim:

1. In an apparatus for manufacturing fixed electrical resistors of a type having a substantially cylindrical body and leads affixed to said body at the ends thereof substantially along the longitudinal axis thereof, the combination comprising, (a) a head rotatable in a vertical plane,
   (b) means for rotating said head embodying indexing means for providing a plurality of dwells in the rotation of said head, said head being operatively connected to said indexing means and responsive thereto,
   (c) spindle means comprising a plurality of pairs of chucks operatively associated with said head and rotatable therewith in said vertical plane, each of the chucks of each said pair of chucks being disposed in an opposing relationship to the other, said pairs of chucks being suitable for receiving resistor parts,
   (d) means for providing a second rotation of said chucks independent of said head rotation for rotating said resistors about the longitudinal axis thereof,
   (e) resistor assembling means for feeding resistor parts comprising an individual substantially cylindrical resistor blank and a pair of resistor leads, and disposing said leads in a predetermined opposing relationship in said chucks and disposing said blank between said leads,
   (f) means for stopping said second rotation of said pairs of chucks in a predetermined desired position relative to each other and to said head while feeding said blank and leads thereto,
   (g) means for individually retracting at least one chuck of each said pairs of chucks to facilitate assembling the resistor parts,
   (h) means for clamping said leads in said chucks to prevent axial movement while permitting longitudinal movement of said leads with respect to said chucks,
   (i) means for applying conductive material to the junctions of said resistor blank and said leads to provide electrical continuity therebetween,
   (j) encapsulation means for applying an adherent dielectric coating to said resistor blank and a portion of said leads and for adhering said leads to said blank,
   (k) means for stopping said second rotation of said pairs of chucks in a predetermined desired position relative to each other and to said head while removing the completed resistor therefrom,
   (l) means for unclamping the leads of said completed resistor in said chucks to facilitate removal of said resistor from said chucks, and
   (m) means for removing said resistor from said chucks.

2. In the apparatus of claim 1 the combination wherein said resistor assembling means comprise,
    (a) means for feeding said pair of leads in an opposing relationship to one another,
    (b) means for feeding said resistor blank,
    (c) means for guiding each of said pair of leads to a predetermined position suitable for loading in said chucks,
    (d) means for loading one of said leads in one of said pair of chucks,
    (e) means for loading the other of said leads in the other of said pair of chucks, and
    (f) means for disposing said resistor blank between said leads.

3. In the apparatus of claim 1 the combination wherein said means for applying conductive material comprise,
    (a) a reservoir of powdered conductive material,
    (b) a pair of plasma torches for emitting plasma streams, one of said streams being directed to impinge on the junction of one of said leads and said resistor blank and the other of said streams being directed to impinge on the junction of the other of said leads and said resistor blank,
    (c) means for feeding said conductive material in predetermined amounts and during desired periods of time into said streams, and
    (d) means for masking the central portion of said resistor blank to prevent said conductive material from being applied thereon.

4. In the apparatus of claim 1 the combination wherein said encapsulation means comprise,
    (a) a reservoir of powdered dielectric encapsulating material,
    (b) a plasma torch for emitting a plasma stream directed to impinge on said resistor blank and a portion of said leads, and
    (c) means for feeding said powdered dielectric encapsulating material in predetermined amounts and during desired periods of time into said stream, whereby the powder particles become molten in said stream and flow together on said resistor blank and said portion of said leads to form a continuous coating and whereby said coating transfers sufficient heat to said leads to fuse them to said resistor blank.

5. In the apparatus of claim 4 the combination wherein said encapsulation means further comprise means for traversing said plasma torch forward and backward along the length of said resistor blank and said portion of said leads to direct said stream and encapsulating material, and apply a uniform coating of said material thereto.

6. In the apparatus of claim 5 the combination wherein said encapsulation means further comprise means for diverting said stream to prevent impingement thereof on said resistor while said torch is stationary.

7. In the apparatus of claim 1 the combination further comprising means for annealing said adherent dielectric coating.

8. In the apparatus of claim 1 the combination further comprising means for sensing and indicating resistance of a resistor being fabricated.

9. In the apparatus of claim 1 the combination further comprising means for sorting completed resistors into groups according to desired characteristics thereof.

10. In an apparatus for manufacturing electrical components of a type having a substantially cylindrical body and leads affixed to said body at the ends thereof substantially along the longitudinal axis thereof, the combination comprising,
    (a) a rotatable head,
    (b) means for rotating said head,
    (c) spindle means operatively associated with said head and rotatable therewith for holding said component,
    (d) means for providing a second rotation of said spindle means independent of said head rotation for rotating said components about the longitudinal axis thereof,
    (e) component assembling means for feeding an individual component body and a pair of leads and disposing said leads in a predetermined opposing relationship in said spindle means and disposing said body between them,
    (f) means for applying conductive material to the junction between said body and said leads to provide electrical continuity therebetween, and
    (g) encapsulation means for applying an adherent dielectric coating to said component body and a portion of said leads.

11. In an apparatus for manufacturing electrical components of a type having a substantially cylindrical body and leads affixed to said body at the ends thereof substantially along the longitudinal axis thereof, the combination comprising,
    (a) a rotatable head,
    (b) means for rotating said head embodying indexing means for providing a plurality of dwells in the rotation of said head, said head being operatively connected to said indexing means and responsive thereto,
    (c) spindle means comprising a plurality of pairs of chucks operatively associated with said head and rotatable therewith, each of the chucks of each said pair of chucks being disposed in an opposing relationship to the other, said pairs of chucks being suitable for receiving parts of said electrical component,
    (d) means for providing a second rotation of said chucks independent of said head rotation for rotating said component about the longitudinal axis thereof,
    (e) component assembling means for feeding an individual component body and a pair of leads and disposing said leads in a predetermined opposing relationship in said chucks and disposing said body between them,
    (f) means for applying conductive material to the junction between said body and said leads to provide electrical continuity therebetween, and
    (g) encapsulation means for applying an adherent dielectric coating to said component body and a portion of said leads.

12. In the apparatus of claim 11 the combination wherein said component assembling means comprise,
    (a) means for feeding said pair of leads in an opposing relationship to one another,
    (b) means for feeding said component body,
    (c) means for guiding each of said pair of leads to a predetermined position suitable for loading in said chucks,
    (d) means for loading one of said leads in one of said pair of chucks,
    (e) means for loading the other of said leads in the other of said pair of chucks, and
    (f) means for disposing said component body between said leads.

13. In the apparatus of claim 11 the combination further comprising means for stopping said second rotation of said pair of chucks in a predetermined desired position relative to each other and to said head while feeding said body and leads thereto.

14. In the apparatus of claim 13 the combination further comprising means for individually retracting at least one chuck of each said pairs of chucks to facilitate assembling the component parts.

15. In the apparatus of claim 14 the combination further comprising means for clamping said leads in said chucks to prevent axial movement while permitting longitudinal movement of said leads with respect to said chucks.

16. In the apparatus of claim 15 the combination wherein said component assembling means comprise,
    (a) means for feeding said pair of leads in an opposing relationship to one another, (b) means for feeding said component body, (c) means for guiding each of said pair of leads to a predetermined position suitable for loading in said chuck, (d) means for loading one of said leads in one of said pair of chucks, (e) means for loading the other of said leads in the other of said pair of chucks, and (f) means for disposing said component body between said leads.

17. In the apparatus of claim 15 the combination further comprising means for removing said component from said chucks.

18. In the apparatus of claim 17 the combination further comprising means for stopping said second rotation of said pairs of chucks in a predetermined desired position relative to each other and to said head while removing the completed component therefrom.

19. In the apparatus of claim 18 the combination further comprising means for unclamping the leads of said completed component in said chucks to facilitate removal of said component from said chucks.

20. In the apparatus of claim 11 the combination wherein said means for applying conductive material comprise, (a) a reservoir of powdered conductive material, (b) a pair of plasma torches for emitting plasma streams, one of said streams being directed to impinge on the junction of one of said leads and said component body, and the other of said streams being directed to impinge on the junction of the other of said leads and said component body, (c) means for feeding conductive material in predetermined amounts and during desired periods of time into said streams, and (d) means for masking the central portion of said component body to prevent said conductive material from being applied thereon.

21. In the apparatus of claim 11 the combination further comprising means for annealing said adherent dielectric coating.

22. In the apparatus of claim 11 the combination further comprising means for sensing and indicating electrical parameters of a component being fabricated.

23. In the apparatus of claim 11 the combination further comprising means for sorting completed components into groups according to desired characteristics thereof.

24. In the apparatus of claim 11 the combination wherein said encapsulation means comprise, (a) a reservoir of powdered dielectric encapsulating material, (b) a plasma torch for emitting a plasma stream directed to impinge on said component body and a portion of said leads, and (c) means for feeding said powdered dielectric encapsulating material in predetermined amounts and during desired periods of time into said stream, whereby the powdered particles become molten in the said stream and flow together on said component body and said portion of said leads to form a continuous coating and whereby said coating transfers sufficient heat to said leads to fuse them to said component body.

25. In the apparatus of claim 24 the combination wherein said encapsulation means further comprise means for traversing said plasma torch forward and backward along the length of said component body and said portion of said leads to direct said stream and encapsulating material, and apply a uniform coating of said material thereto.

26. In the apparatus of claim 25 the combination wherein said encapsulation means further comprise means for diverting said stream to prevent impingement thereof on said component while said torch is stationary.

27. In the apparatus of claim 19 the combination wherein said means for applying conductive material comprise, (a) a reservoir of powdered conductive material, (b) a pair of plasma torches for emitting plasma streams, one of said streams being directed to impinge on the junction of one of said leads and said component body and the other of said streams being directed to impinge on the junction of the other of said leads and said component body, (c) means for feeding said conductive material in predetermined amounts and during desired periods of time into said streams, and (d) means for masking the central portion of said component body to prevent said conductive material from being applied thereon.

28. In the apparatus of claim 19 the combination wherein said encapsulation means comprise, (a) a reservoir of powdered dielectric encapsulating material, (b) a plasma torch for emitting a plasma stream directed to impinge on said component body and a portion of said leads, and (c) means for feeding powdered dielectric encapsulating material in predetermined amounts and during desired periods of time into said stream, whereby the powdered particles become molten in said stream and flow together on said component body and said portion of said leads to form a continuous coating and whereby said coating transfers sufficient heat to said leads to fuse them to said component body.

29. In the apparatus of claim 28 the combination wherein said encapsulation means further comprise means for traversing said plasma torch forward and backward along the length of said component body and said portion of said leads to direct said stream and encapsulating material, and apply a uniform coating of said material thereto.

30. In the apparatus of claim 29 the combination wherein said encapsulation means further comprise means for diverting said stream to prevent impingement thereof on said component while said torch is stationary.

31. In the apparatus of claim 16 the combination wherein said means for applying conductive material comprise, (a) a reservoir of powdered conductive material, (b) a pair of plasma torches for emitting plasma streams, one of said streams being directed to impinge on the junction of one of said leads and said component body and the other of said streams being directed to impinge on the junction of the other of said leads and said component body.

(c) means for feeding said conductive material in predetermined amounts and during desired periods of time into said streams, and (d) means for masking the central portion of said component body to prevent said conductive material from being applied thereon.

32. In the apparatus of claim 31 the combination wherein said encapsulation means comprise, (a) a reservoir of powdered dielectric encapsulating material, (b) a plasma torch for emitting a plasma stream directed to impinge on said component body and a portion of said leads, and (c) means for feeding said powdered dielectric encapsulating material in predetermined amounts and during desired periods of time into said streams, whereby the powdered particles become molten in said streams and flow together on said component body and said portion of said leads to form a continuous coating and whereby said coating transfers sufficient heat to said leads to fuse them to said component body.

33. In the apparatus of claim 32 the combination wherein said encapsulation means further comprise means for traversing said plasma torch forward and backward along the length of said component body and said portion of said leads to direct said stream and encapsulating material, and apply a uniform coating of said material thereto.

34. In an apparatus for manufacturing fixed electrical resistors of a type having a substantially cylindrical body and leads affixed to said body at the ends thereof substantially along the longitudinal axis thereof, the combination comprising,
(a) a rotatable head
(b) means for rotating said head embodying indexing means for providing a series of dwells in the rotation of said head, said head being operatively connected to said indexing means and responsive thereto,
(c) spindle means comprising a plurality of pairs of chucks operatively associated with said head and rotatable therewith, each of the chucks of said pair of chucks being disposed in an opposing relationship to the other, said pairs of chucks being suitable for receiving a resistor blank and a pair of leads,
(d) means for providing a second rotation of said chucks independent of said head rotation for rotating said resistors about the longitudinal axis thereof,
(e) means for stopping said second rotation of said pairs of chucks in a predetermined desired position relative to each other and to said head while feeding said blank and said pair of leads thereto,
(f) means for individually retracting at least one chuck of each said pairs of chucks to facilitate assembling said blank and said pair of leads,
(g) means for feeding said pair of leads,
(h) means for feeding said resistor blank,
(i) means for guiding each of said pair of leads to a predetermined position suitable for loading in said chucks,
(j) means for loading one of said leads in one of said pair of chucks,
(k) means for loading the other of said leads in the other of said pair of chucks in an opposing relationship to said one of said leads,
(l) means for clamping said leads in said chucks to prevent axial movement while permitting longitudinal movement of said leads with respect to said chucks,
(m) means for disposing said resistor blank between said leads,
(n) a reservoir of powdered conductive material,
(o) first and second plasma torches for emitting first and second plasma streams, said first stream being directed to impinge on the junction of one of said leads and said resistor blank and second said stream being directed to impinge on the junction of the other of said leads and said resistor blank,
(p) means for feeding said conductive material in predetermined amounts and during desired periods of time into said first and second streams,
(q) means for masking the central portion of said resistor blank to prevent said conductive material from being applied thereon,
(r) a reservoir of powdered dielectric encapsulating material,
(s) a third plasma torch for emitting a third plasma stream directed to impinge on said resistor and a portion of said leads,
(t) means for feeding said powdered dielectric encapsulating material in predetermined amounts and during desired periods of time into said third stream, whereby said particles become molten in said third stream, and flow together on said resistor blank and said portion of said leads to form a continuous adherent dielectric coating and whereby said coating transfers sufficient heat to said leads to fuse them to said resistor body,
(u) means for traversing said third plasma torch forward and backward along the length of said resistor blank and said portion of said leads to direct said third stream and said encapsulating material, and apply a uniform coating of said material thereto,
(v) means for diverting said third stream to prevent impingement thereof on said resistor while said torch is stationary,
(w) means for annealing said adherent dielectric coating,
(x) means for sensing and indicating resistance of a resistor being fabricated,
(y) means for stopping said second rotation of said pairs of chucks in a predetermined desired position relative to each other and to said head while removing the completed resistor therefrom,
(z) means for unclamping the leads of said completed resistor in said chucks to facilitate removal of said resistor from said chucks,
(aa) means for removing said resistor from said chucks, and
(bb) means for sorting said completed resistors into groups according to desired characteristics thereof.

References Cited by the Examiner
UNITED STATES PATENTS

| | | | |
|---|---|---|---|
| 1,899,114 | 2/33 | Schmidt | 29—33.9 |
| 2,394,881 | 2/46 | Stuhlfauth | 29—33.9 |
| 2,922,869 | 1/60 | Giannini et al. | 117—93.1 |
| 3,054,167 | 9/62 | Bryner et al. | 29—203 |
| 3,075,066 | 1/63 | Yenni et al. | 219—76 |
| 3,114,826 | 12/63 | Sullivan | 219—76 |

WHITMORE A. WILTZ, *Primary Examiner.*
THOMAS H. EAGER, *Examiner.*